(12) United States Patent
Banerjee et al.

(10) Patent No.: US 7,847,697 B2
(45) Date of Patent: Dec. 7, 2010

(54) RADIO FREQUENCY IDENTIFICATION (RFID) TAG INCLUDING A THREE-DIMENSIONAL LOOP ANTENNA

(75) Inventors: Swagata R. Banerjee, North Oaks, MN (US); Robert A. Sainati, Bloomington, MN (US); William C. Egbert, Minneapolis, MN (US); David K. Misemer, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 243 days.

(21) Appl. No.: 12/143,573

(22) Filed: Jun. 20, 2008

(65) Prior Publication Data

US 2009/0207027 A1 Aug. 20, 2009

Related U.S. Application Data

(60) Provisional application No. 61/028,581, filed on Feb. 14, 2008.

(51) Int. Cl.
  *G08B 13/14* (2006.01)
(52) U.S. Cl. .............. 340/572.7; 340/572.1; 340/572.4; 340/572.8; 340/573.4; 235/375; 235/385; 235/492
(58) Field of Classification Search .............. 340/572.7, 340/572.8, 572.4, 572.1, 573.4; 235/375, 235/385, 492
  See application file for complete search history.

(56) References Cited

U.S. PATENT DOCUMENTS

| | | |
|---|---|---|
| 4,853,705 A | 8/1989 | Landt |
| 5,182,570 A | 1/1993 | Nysen et al. |
| 5,528,222 A | 6/1996 | Moskowitz et al. |
| 5,771,021 A | 6/1998 | Veghte et al. |
| 5,963,134 A | 10/1999 | Bowers et al. |
| 6,031,505 A | 2/2000 | Qi et al. |
| 6,037,879 A | 3/2000 | Tuttle |

(Continued)

FOREIGN PATENT DOCUMENTS

DE        195 34 229        3/1997

(Continued)

OTHER PUBLICATIONS

Product Literature: Cuming Microwave, C-RAM SFC, Technical Bulletin 390-1, Document Control No. N-15-000-0088-J, 2 pages, Jun. 15, 2007.

(Continued)

*Primary Examiner*—Tai T Nguyen

(57) ABSTRACT

This disclosure describes a radio frequency identification (RFID) tag that includes a three-dimensional (3D) loop antenna. The 3D loop antenna includes a first conductive portion having a length and width that substantially exceed a thickness. The length and width of the first conductive portion substantially lie in a first plane. The 3D loop antenna includes a second conductive portion having a length and width that substantially exceed a thickness. The length and width of the second conductive portion substantially lie in a second plane that is substantially parallel to the first plane. An RFID circuit electrically connected to the loop antenna excites a current through the first and second conductive portions in a current loop that lies in a third plane that is not substantially parallel to the first and second planes. In some instances the third plane may be substantially perpendicular to the first and second planes.

47 Claims, 24 Drawing Sheets

U.S. PATENT DOCUMENTS

| | | | |
|---|---|---|---|
| 6,100,804 | A | 8/2000 | Brady et al. |
| 6,130,612 | A | 10/2000 | Castellano et al. |
| 6,147,605 | A | 11/2000 | Vega et al. |
| 6,184,834 | B1 | 2/2001 | Utsumi et al. |
| 6,232,870 | B1 | 5/2001 | Garber et al. |
| 6,265,977 | B1 | 7/2001 | Vega et al. |
| 6,285,342 | B1 | 9/2001 | Brady et al. |
| 6,304,169 | B1 | 10/2001 | Blama et al. |
| 6,329,951 | B1 | 12/2001 | Wen et al. |
| 6,366,260 | B1 | 4/2002 | Carrender |
| 6,384,727 | B1 | 5/2002 | Diprizio et al. |
| 6,459,588 | B1 | 10/2002 | Morizumi et al. |
| 6,466,131 | B1 | 10/2002 | Tuttle et al. |
| 6,480,110 | B2 | 11/2002 | Lee et al. |
| 6,486,780 | B1 | 11/2002 | Garber et al. |
| 6,501,435 | B1 | 12/2002 | King et al. |
| 6,522,308 | B1 | 2/2003 | Mathieu |
| 6,630,910 | B2 | 10/2003 | Forster et al. |
| 6,657,592 | B2 | 12/2003 | Dening et al. |
| 6,853,345 | B2 | 2/2005 | King et al. |
| 6,862,004 | B2 | 3/2005 | Alexopoulos et al. |
| 6,950,071 | B2 | 9/2005 | Wen et al. |
| 6,956,472 | B1 | 10/2005 | Walcott, Jr. et al. |
| 7,123,151 | B2 | 10/2006 | Garber et al. |
| 2002/0003496 | A1 | 1/2002 | Brady et al. |
| 2003/0091789 | A1 | 5/2003 | Koskenmaki et al. |
| 2004/0056823 | A1 | 3/2004 | Zuk et al. |
| 2004/0217865 | A1 | 11/2004 | Turner |
| 2005/0024287 | A1 | 2/2005 | Jo et al. |
| 2005/0212707 | A1 | 9/2005 | Egbert et al. |
| 2006/0043199 | A1 | 3/2006 | Baba et al. |
| 2006/0139172 | A1 | 6/2006 | Waldner et al. |
| 2007/0182559 | A1* | 8/2007 | Lawrence et al. ........ 340/572.7 |
| 2008/0246614 | A1* | 10/2008 | Paananen ................. 340/572.7 |
| 2009/0207027 | A1 | 8/2009 | Banerjee et al. |

FOREIGN PATENT DOCUMENTS

| | | |
|---|---|---|
| DE | 101 36 502 A1 | 2/2003 |
| DE | 10 2006 057369 A1 | 6/2008 |
| EP | 0 274 592 A1 | 7/1988 |
| EP | 0 696 778 A1 | 2/1996 |
| EP | 1 585 191 A1 | 3/1997 |
| EP | 0 969 547 A2 | 1/2000 |
| EP | 1 026 779 A2 | 8/2000 |
| EP | 1 626 364 A2 | 2/2006 |
| EP | 1 818 861 A2 | 8/2007 |
| JP | 52-052549 | 4/1977 |
| WO | WO 99/65002 | 12/1999 |
| WO | WO 00/10122 | 2/2000 |
| WO | WO 00/21030 | 4/2000 |
| WO | WO 00/26993 | 5/2000 |
| WO | WO 00/59067 | 10/2000 |
| WO | WO 01/67384 A1 | 9/2001 |
| WO | WO 2005/022690 A1 | 3/2005 |
| WO | WO 2006/021914 A1 | 3/2006 |

OTHER PUBLICATIONS

Multek Flexible Circuits, Inc., Flexible Circuit Design Guidelines, Document DG 01 Rev. C, 9 pages, Jan. 2005.

Technical Information Sheet: LOCTITE®, Product 3447, Henkel Loctite Corporation, Jun. 2003.

Product Literature: What is Styrofoam?, The Dow Chemical Company, 2 pages, website: http://building.dow.com/styrofoam/what.htm (printed Mar. 26, 2008).

Shortley et al., "Elements of Physics", Prentice-Hall, Inc., Englewood Cliffs, NJ, 1971, pp. 690-693.

Horowitz et al., "The Art of Electronics", Cambridge University Press, Cambridge, England, 1980, pp. 29, 565-568.

Morrow et al., "Rolled Edge Ultra-wideband Dipole Antenna for GPR Application", IEEE Antennas and Propagation Society International Symposium, 2002 Digest, Jun. 16-21, 2002, New York, NY, vol. 1 of 4, Jun. 16, 2002, pp. 484-487.

Product Literature: Avery Dennison, Avery Dennison AD-220 RFID Dry Inlay and Labels, 7 pages, http://www.racoindustries.com/avad220.htm, printed May 27, 2008.

Kleist et al., "RFID Labeling, Smart Labeling Concepts & Applications for the Consumer Packaged Goods Supply Chain", Printronix, Inc., 211 pp., ISBN-0-9760086-0-2 (2004).

* cited by examiner

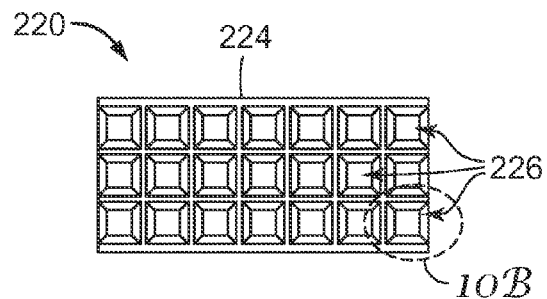
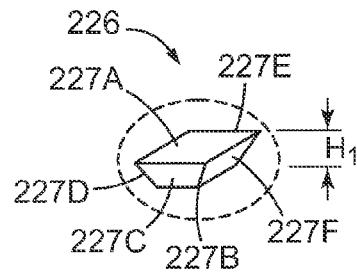
FIG. 10A    FIG. 10B
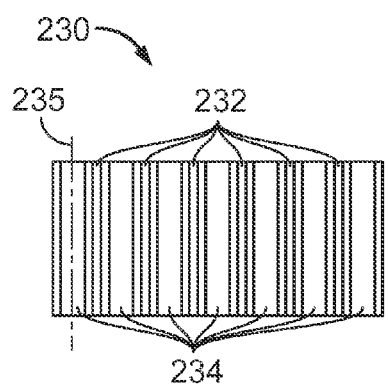
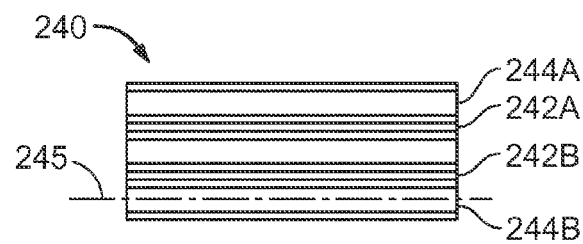
FIG. 11A    FIG. 11B
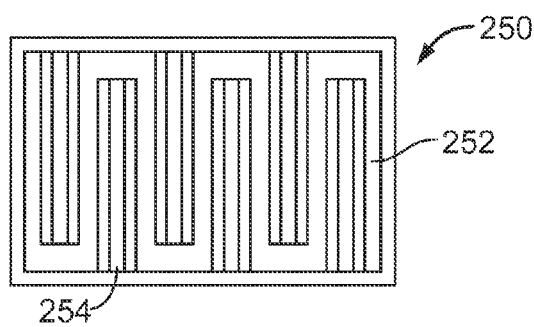
FIG. 12

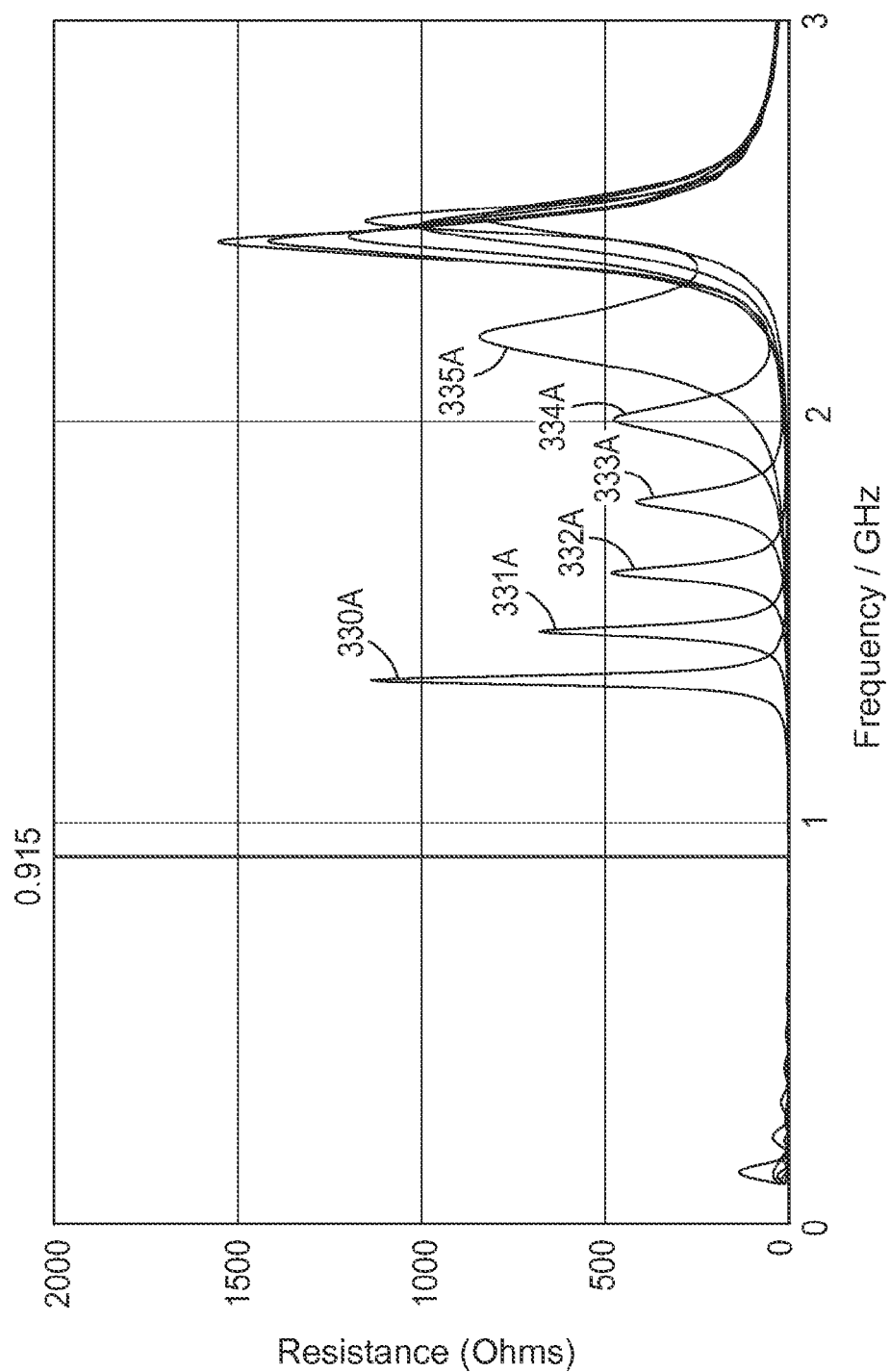

RADIO FREQUENCY IDENTIFICATION (RFID) TAG INCLUDING A THREE-DIMENSIONAL LOOP ANTENNA

RELATED APPLICATION

This application claims the benefit of U.S. Provisional Patent Application No. 61/028,581, filed Feb. 14, 2008, the disclosure of which is incorporated by reference herein in its entirety.

TECHNICAL FIELD

The invention relates to radio frequency identification (RFID) systems for article management and, more specifically, to RFID tags.

BACKGROUND

Radio frequency identification (RFID) technology has become widely used in virtually every industry, including transportation, manufacturing, waste management, postal tracking, airline baggage reconciliation, and highway toll management. A typical RFID system includes a plurality of RFID tags, at least one RFID reader (also referred to as an "interrogator") or detection system having an antenna for communicating with the RFID tags, and a computing device to control the RFID reader. The RFID reader includes a transmitter that may provide energy or information to the tags, and a receiver to receive identity and other information from the tags. The computing device processes the information obtained by the RFID reader.

In general, the information received from an RFID tag is specific to the particular application, but often provides an identification for an article to which the tag is fixed. Exemplary articles include manufactured items, books, files, animals or individuals, or virtually any other tangible articles. Additional information may also be provided for the article. The tag may be used during a manufacturing process, for example, to indicate a paint color of an automobile chassis during manufacturing or other useful information.

The transmitter of the RFID reader outputs radio frequency (RF) signals through the antenna to create an electromagnetic field that enables the tags to return an RF signal carrying the information. In some configurations, the transmitter initiates communication, and makes use of an amplifier to excite the antenna with a modulated output signal to communicate with the RFID tag. In other configurations, the RFID tag receives a continuous wave signal from the RFID reader and initiates communication by responding immediately with its information.

A conventional tag may be an "active" tag that includes an internal power source, or a "passive" tag that is energized by the RF field created by the RFID reader (typically by inductive coupling). In either case, the tags communicate using a pre-defined protocol, allowing the RFID reader to receive information from one or more tags. The computing device serves as an information management system by receiving the information from the RFID reader and performing some action, such as updating a database. In addition, the computing device may serve as a mechanism for programming data into the tags via the transmitter.

SUMMARY

In general, this disclosure describes a three dimensional (3D) loop antenna that may reduce adverse effects to the performance of an RFID tag that are attributable to the coupling between the RFID tag and an electrically conductive surface on which the RFID tag is placed. RFID tags designed in accordance with this disclosure include a 3D loop antenna coupled to an RFID circuit. As will be described in detail herein, the 3D loop antenna includes a first conductive portion having a length and width that substantially exceed a thickness of the first conductive portion and lie in a first plane. The first conductive portion is electrically coupled to a second conductive portion having a length and width that substantially exceed a thickness of the second conductive portion and lie in a second plane. The first and second planes are substantially parallel to one another. A current is excited through the first and second conductive portions in a current loop that lies in a third plane that is not substantially parallel to the first and second planes. The current excited through the first and second conductive portions may, for example, be a re-modulated interrogation signal that is backscattered by the RFID circuit, e.g., in the case of a passive RFID tag. In other instances, e.g., in the case of an active RFID tag, the RFID circuit may generate the signal that excites the current through the conductive portions.

The RFID tag is configured such that when placed on a surface of an article the first and second planes are substantially parallel to the surface of the article. In this manner, the plane of the current loop through which the current that is excited is not substantially parallel to the article surface to which the RFID tag is attached. For example, in some embodiments, the plane in which the current loop of the antenna lies may be substantially perpendicular to the article surface.

In some embodiments, the first and second conductive portions of the 3D loop antenna may be defined by an antenna material including one or more portions defining a continuous loop for a RF current. In other embodiments, the 3D antenna loop may be defined by a combination of the antenna material and an electrically conductive article surface on which the RFID tag is placed. In the latter embodiment, the electrically conductive article surface and the antenna material define a closed loop for a current flow. Thus, the conductive article surface acts as part the 3D antenna. The electrically conductive surface and the antenna material may form the closed loop via a direct electrical connection or via capacitive coupling.

The 3D loop antenna may further be designed such that a portion of the antenna functions as a tuning element to match an impedance of the antenna to an impedance of the IC chip to which the antenna is coupled. As an example, the conductive trace that forms the 3D loop antenna may include one or more slits that function as a capacitive tuning element. As another example, the 3D loop antenna may have overlapping conductive portions that function as a capacitive tuning element. As a further example, the conductive trace that forms the 3D loop antenna may include a region of interdigitated conductive fingers to enhance the capacitance for better tuning.

The RFID tag may be attached to a substantially non-planar surface of the article via a mounting member. The mounting member may be flexible to conform to a curved or irregularly shaped (substantially non-planar) surface and may be attached to a lower portion of the RFID tag, i.e., between the RFID tag and the article surface. The mounting member may be ribbed, include a plurality of sections that are spaced apart from each other, or otherwise have a structure that promotes flexibility.

In one embodiment, a radio frequency identification (RFID) tag comprises a loop antenna that includes a first conductive portion having a length and width that substantially exceed a thickness of the first conductive portion. The length and width of the first conductive portion substantially lie in a first plane. At least a portion of the first conductive portion forms a tuning element for tuning an impedance of the loop antenna. The loop antenna also includes a second conductive portion having a length and width that substantially exceed a thickness of the second conductive portion. The length and width of the second conductive portion substantially lie in a second plane that is substantially parallel to the first plane. The second conductive portion is electrically coupled to the first conductive portion. The RFID tag also comprises an RFID circuit electrically connected to the loop antenna to excite a current through the loop antenna to flow through the first conductive portion and the second conductive portion in a current loop that lies in a third plane that is substantially perpendicular to the first plane and the second plane.

In another embodiment, a radio frequency identification (RFID) system comprises a reader unit, configured to output an interrogating radio frequency (RF) field, and an RFID tag. The RFID tag includes a loop antenna that has a first conductive portion having a length and width that substantially exceed a thickness of the first conductive portion. The length and width of the first conductive portion substantially lie in a first plane. At least a portion of the first conductive portion forms a tuning element for tuning an impedance of the loop antenna. The loop antenna also includes a second conductive portion having a length and width that substantially exceed a thickness of the second conductive portion. The length and width of the second conductive portion substantially lie in a second plane that is substantially parallel to the first plane. The second conductive portion is electrically coupled to the first conductive portion. The RFID tag also includes an RFID circuit electrically connected to the loop antenna to excite a current through the first conductive portion and the second conductive portion in a current loop that lies in a third plane that is substantially perpendicular to the first plane and the second plane, to output an RF signal in response to the interrogating RF signal.

In another embodiment, an article comprises an electrically conductive surface and an radio frequency identification (RFID) tag coupled to the electrically conductive surface of the article. The RFID tag comprises a loop antenna comprising a first conductive portion having a length and width that substantially exceed a thickness of the first conductive portion, wherein the length and width of the first conductive portion substantially lie in a first plane. At least a portion of the first conductive portion forms a tuning element for tuning an impedance of the loop antenna. The loop antenna also comprises a second conductive portion having a length and width that substantially exceed a thickness of the second conductive portion, wherein the length and width of the second conductive portion substantially lie in a second plane that is substantially parallel to the first plane. The second conductive portion is electrically coupled to the first conductive portion. The RFID tag also includes an RFID circuit electrically connected to the loop antenna to excite a current through the loop antenna to flow through the first conductive portion and the second conductive portion in a current loop that lies in a third plane that is not substantially parallel to the electrically conductive surface of the article.

In another embodiment, an assembly comprises an RFID tag, a mounting member configured to mount the RFID tag on a substantially non-planar surface. The mounting member comprises a substantially flat and flexible base member comprising an upper surface and a lower surface opposite the upper surface, and a plurality of mounting structures protruding from the lower surface.

In another embodiment, a method comprises at least partially filling a cavity with a curable resin, pressing a shaping tool into the cavity to shape the resin, removing the shaping tool after the material has cured thereby defining a plurality of mounting structures extending from a base member, removing the base member and plurality of mounting structures from the cavity, the base member being substantially flat and comprising an upper surface configured to attach to an radio frequency identification (RFID) tag and a lower surface, the mounting structures extending from the lower surface, and coupling one or more RFID tags to the upper surface of the base member.

In another embodiment, a radio frequency identification (RFID) tag comprises a loop antenna that includes a first conductive portion having a length and width that substantially exceed a thickness of the first conductive portion. The length and width of the first conductive portion substantially lie in a first plane. The loop antenna also includes a second conductive portion having a length and width that substantially exceed a thickness of the second conductive portion. The length and width of the second conductive portion substantially lie in a second plane that is substantially parallel to the first plane. The second conductive portion is electrically coupled to the first conductive portion. The second conductive portion is also configured to couple to a conductive surface of an article to which the RFID tag is attached. The RFID tag also comprises an RFID circuit electrically connected to the loop antenna to excite a current through the loop antenna to flow through the first conductive portion, the second conductive portion, and the conductive surface of the article to which the RFID tag is attached in a current loop that lies in a third plane that is substantially perpendicular to the first plane and the second plane.

In another embodiment, a radio frequency identification (RFID) system comprises a reader unit, configured to output an interrogating radio frequency (RF) field, and an RFID tag. The RFID tag includes a loop antenna that has a first conductive portion having a length and width that substantially exceed a thickness of the first conductive portion. The length and width of the first conductive portion substantially lie in a first plane. The loop antenna also includes a second conductive portion having a length and width that substantially exceed a thickness of the second conductive portion. The length and width of the second conductive portion substantially lie in a second plane that is substantially parallel to the first plane. The second conductive portion is electrically coupled to the first conductive portion. The second conductive portion is also configured to couple to a conductive surface of an article to which the RFID tag is attached. The RFID tag also includes an RFID circuit electrically connected to the loop antenna to excite a current through the first conductive portion, the second conductive portion, and the conductive surface of the article to which the RFID tag is attached in a current loop that lies in a third plane that is substantially perpendicular to the first plane and the second plane, to output an RF signal in response to the interrogating RF signal.

In another embodiment, an article comprises an electrically conductive surface and an radio frequency identification (RFID) tag coupled to the electrically conductive surface of the article. The RFID tag comprises a loop antenna comprising a first conductive portion having a length and width that substantially exceed a thickness of the first conductive portion, wherein the length and width of the first conductive portion substantially lie in a first plane. The loop antenna also comprises a second conductive portion having a length and width that substantially exceed a thickness of the second conductive portion, wherein the length and width of the second conductive portion substantially lie in a second plane that is substantially parallel to the first plane. The second conductive portion is electrically coupled to the first conductive portion. The second conductive portion is also configured to couple to a conductive surface of an article to which the RFID tag is attached. The RFID tag also includes an RFID circuit electrically connected to the loop antenna to excite a current through the loop antenna to flow through the first conductive portion, the second conductive portion, and the conductive surface of the article to which the RFID tag is attached in a current loop that lies in a third plane that is not substantially parallel to the electrically conductive surface of the article.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIGS. 10A and 10B illustrate an exemplary configuration for a mounting member.

FIG. 11A is a plan view illustrating another example configuration for a mounting member.

FIG. 11B is a plan view illustrating an additional example configuration for a mounting member.

FIG. 12 is a plan view illustrating yet another example configuration for a mounting member.

FIGS. 19A and 19B are graphs demonstrating example resistance and reactance curves that parameterize the slit offset $S_{OFFSET}$) of RFID tag of FIGS. 15A and 15B.

DETAILED DESCRIPTION

Figure 1:
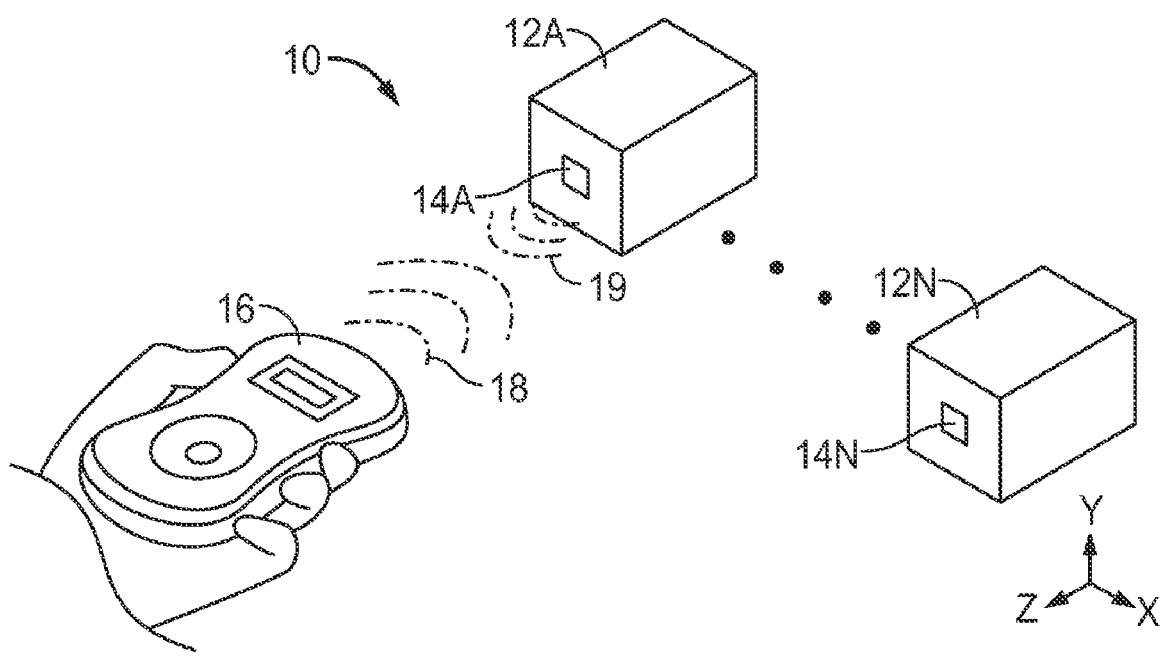
FIG. 1 is a perspective view of an exemplary radio frequency identification (RFID) system for locating a plurality of articles.

RFID systems have become widely used in virtually every industry to track articles and prevent unauthorized removal of articles from a protected area, such as a library or retail store. Conventional RFID tags used in such RFID systems may, however, encounter a number of adverse effects when attached to an article that has an electrically conductive surface. For example, the coupling between the conventional RFID tags and the electrically conductive surface of the article to which it is attached may result in a decreased read range. In other words, the range over which the tag can be read is decreased.

This disclosure describes a three dimensional (3D) loop antenna that may reduce adverse effects to the performance of an RFID tag, such as a decreased read range, that are attributable to the coupling between the RFID tag and the electrically conductive surface on which the RFID tag is placed. That is, unlike conventional RFID tags that utilize a dipole antenna or other substantially two-dimensional (2D) or 3D antenna configurations, the read range of a 3D loop antenna designed in accordance with this disclosure may not be prohibitively limited when the RFID tag is attached to an electrically conductive surface.

RFID tags designed in accordance with this disclosure include a 3D loop antenna coupled to an RFID circuit. As will be described in detail herein, the 3D loop antenna includes a first conductive portion having a length and width that substantially exceed a thickness of the first conductive portion and lie in a first plane. The first conductive portion is electrically coupled to a second conductive portion having a length and width that substantially exceed a thickness of the second conductive portion and lie in a second plane. The first and second planes are substantially parallel to one another. A current is excited in the first and second conductive portions in a current loop that lies in a third plane that is not substantially parallel to the first and second planes. The current excited in the first and second conductive portions may, for example, be a re-modulated interrogation signal that is back-scattered by the RFID circuit, e.g., in the case of a passive RFID tag. In other instances, e.g., in the case of an active RFID tag, the RFID circuit may generate a signal that excites a current through the conductive portions.

The RFID tag is configured such that when placed on a surface of an article the first and second planes are substantially parallel to the surface of the article. In this manner, the plane of the current loop through which the RFID circuit excites current is not substantially parallel to the article surface to which the RFID tag is attached. For example, in some embodiments, the plane in which the current loop of the antenna lies may be substantially perpendicular to the article surface.

In some embodiments, the first and second conductive portions of the 3D loop antenna may be defined by an antenna material including one or more portions defining a continuous loop for a RF current. In other embodiments, the 3D antenna loop may be defined by a combination of the antenna material and an electrically conductive article surface on which the RFID tag is placed. In the latter embodiment, the electrically conductive article surface and the antenna material define a closed loop for a current flow. Thus, the conductive article surface acts as part the 3D antenna. The electrically conductive surface and the antenna material may form the closed loop via a direct electrical connection or via a capacitive coupling.

A "3D configuration" indicates that the antenna lies in three dimensions, and referencing orthogonal x-y-z axes for ease of description, the antenna has an x-axis component, a y-axis component, and a z-axis component. For example, the first and second conductive portions of the 3D loop antenna may lie in an x-y plane while the portion of the antenna that couples the first and second conductive portion lies in the y-z plane. More specifically, the length of the first and second conductive portions may lie along the x-axis and the width of the first and second conductive portions may lie along the y-axis. The portion of the antenna that couples the first and second portions to one another may include a length that lies along the z-axis and a width that lies along the y-axis. Such an antenna configuration would cause the current loop to lie in the x-z plane as described in further detail below. The 3D loop antenna may operate in the ultra high frequency (UHF) range, e.g., in a frequency range of approximately 300 megahertz (MHz) to approximately 3 gigahertz (GHz). However, other operating ranges in the radio frequency spectrum may be used.

A 3D loop antenna configured in accordance with this disclosure may reduce adverse effects to the performance of an RFID tag, such as a decreased read range, that are attributable to coupling between the RFID tag and an electrically conductive surface on which the RFID tag is placed. In other words, a 3D loop antenna configured in accordance with this disclosure may maintain, or possibly increase, its read range even when coupled to an electrically conductive surface while still maintaining relatively small interrogation transmit power of an interrogation device. Rather, the RFID tag that includes the 3D loop antenna may, for example, exhibit a read range of greater than approximately ten feet (approximately 3 meters) even when attached to an electrically conductive surface. The term "read range" generally refers to a communicating operating distance between a reader and the RFID tag.

However, it should be understood the invention is not limited to a read range of greater than approximately 10 feet. Rather, as will be described in this disclosure, the 3D loop antenna may be designed to support any read range, such as a read range of less than approximately one foot (approximately thirty centimeters), approximately one foot to approximately ten feet (approximately thirty centimeters to approximately three meters), or greater than approximately ten feet (greater than approximately three meters). Various design parameters of the 3D loop antenna may be adjusted to achieve a desirable trade-off between performance and size. These trade-offs may be governed by the particular application for which the 3D loop antenna is designed.

Additionally, the RFID tag dimensions may be modified without resulting in a detuning of the antenna by adjusting a feedpoint of the antenna. The feedpoint of the antenna is the location at which an integrated circuit (IC) chip is coupled to the antenna. Thus, the RFID tag may be modified by offsetting the IC chip from the center of the antenna to either side. Retuning the 3D loop antenna via adjusting the feedpoint enables the RFID tag to have a relatively compact RFID tag structure without performance degradation. In some embodiments, the RFID tag may have a relatively small size, e.g., approximately a quarter wavelength or less while maintaining a read range of approximately 10 feet or greater (approximately 3 meters or greater) without the need for increased read power.

The 3D loop antenna may further be designed such that a portion of the antenna functions a tuning element to match an impedance of the antenna to an impedance of the IC chip to which the antenna is coupled. As an example, the conductive trace that forms the 3D loop antenna may include one or more slits that function as capacitive tuning elements. As another example, the 3D loop antenna may have overlapping conductive portions that function as a capacitive tuning element. As a further example, the conductive trace that forms the 3D loop antenna may include a region of interdigitated conductive fingers to enhance the capacitance for better tuning. Although the different tuning element designs are described independently, the 3D loop antenna may utilize more than one type of tuning element, e.g., overlapping conductive portions and a slit.

A mounting member is also described for attaching an RFID tag, such as the RFID tag described in this disclosure, to a substantially non-planar surface. The mounting member, however, is not limited to use with RFID tags including 3D loop antennas described in the present disclosure. Rather, the mounting member may be used to attach any suitable RFID tag to a substantially non-planar surface. The mounting member may include features that promote flexibility, such as a plurality of ribbed structures that run along or across the RFID tag, a plurality of pillars that are spaced apart from each other, a channeled structure, or other structures that promote flexibility for attaching the mounting member to a curved or irregularly shaped (substantially non-planar) surface.

FIG. 1 is a perspective view of an exemplary radio frequency identification (RFID) system 10 for locating a plurality of articles 12A-12N (collectively "articles 12"). RFID system 10 includes RFID tags 14A-14N attached to articles 12A-12N and a portable RFID reader 16, which is adapted to interrogate and obtain data from each of RFID tags 14A-14N (collectively, "RFID tags 14"). Articles 12 may be, for example, both electrically conductive and nonconductive components. RFID tags 14A-14N each include a length that is measured along the x-axis, a width that is measured along the y-axis, and a height that is measured along the z-axis. The orthogonal x-y-z axes shown in FIG. 1 are referenced to aid description of the RFID tag of this disclosure, and are not intended to limit the scope in any way. A surface of each of RFID tags 14A-14N in the x-y plane is adjacent to the respective article 12A-12N and defines a "contact surface area." In one embodiment, an x-y plane of each of RFID tags 14 is attached to the respective article 12A-12N, such as with a pressure sensitive adhesive, tape or foam, or any other suitable mode of attachment. In some embodiments, a mounting member may be attached to each of RFID tags 14. In such embodiments, RFID tags 14 are attached to respective articles 12 via the mounting member.

The placement of RFID tags 14 on the respective articles 12A-12N enables RFID reader 16 to associate a description of an article 12A-12N with the respective RFID tag 14A-14N via radio frequency (RF) signals 18 and 19. For example, the placement of RFID tag 14A on article 12A enables a user to utilize handheld RFID reader 16 to associate a description or other information related to article 12A with RFID tag 14A via RF signals 18 and 19. In an alternate embodiment, reader 16 may be incorporated into an automated or semi-automated process and a user does not necessarily need to utilize reader 16. Reader 16 may interrogate RFID tag 14A by generating RF signal 18, which is received by an antenna disposed within RFID tag 14A. The signal energy typically carries both power and commands to RFID tag 14A. RFID tag 14A receives the RF energy radiated by reader 16 and, if the field strength of the RF signal 18 exceeds a read threshold, RFID tag 14A is energized and backscatters the RF signal 18 from the receiver modulated to include information regarding the object to which the tag is attached. This backscattered signal is represented in FIG. 1 as RF signal 19. That is, the antenna enables RFID tag 14A to collect energy sufficient to power an RFID circuit, e.g., IC chip, coupled to the antenna.

Typically, in response to one or more commands, the RFID circuit remodulates the RF signal from reader 16 and backscatters the modulated signal via the antenna to output an RF response to be detected by reader 16. The response may consist of an RFID tag identifier, which may match an identifier stored within a database of RFID handheld reader 16 or an RFID management system (not shown). Alternatively, the response may consist of the transmittal of data from RFID tags 14 to reader 16. Reader 16 may interface with a data communication port of the RFID management system for communication of data between the reader 16 and the RFID management system. The user (or an automated or semi-automated machine) may utilize RFID reader 16 to locate one or more articles 12 by pointing RFID reader 16 at the respective RFID tags 14. Alternatively, one or more articles 12 may pass in front of RFID reader 16.

When an RFID tag that includes an antenna of a type well known in the art is attached to an electrically conductive surface, the read range of the RFID tag may be substantially reduced. An antenna of a type well known in the art may be a 2D dipole antenna, another 2D antenna, or other 3D antennas known in the art. When such an antenna is energized by an interrogating RF signal, e.g., RF signal 18, the interrogating signal induces currents in the conductive surface on which the RFID tag is placed. The currents on the conductive surface create an electromagnetic field. This field at least partially cancels the fields produced by the antenna. The conductive surface also may cause the impedance of the antenna to shift from the original design value. The shift of the antenna impedance and reduced overall field radiated by the antenna may be reduced such that it does not exceed the read threshold of the RFID tag. In other words, the read range of the RFID tag may be reduced such that the RFID tag is rendered useless, i.e., cannot be read by reader 16 from a useful distance. For example, an RFID tag may be attached to a conductive surface of an article, where the article is located or designed such that reader 16 cannot be positioned closer than approximately ten feet (approximately 3 meters) to the RFID tag because of physical limitations. In this case, if the field strength is reduced such that the read range is less than ten feet (approximately 3 meters), reader 16 may not be able to read the RFID tag.

In accordance with this disclosure, however, one or more of RFID tags 14 include a 3D loop antenna that mitigates at least some of the problems discussed above with respect to reduced read ranges in the presence of conductive surfaces. As discussed with reference to FIGS. 2 and 3 in greater detail, the 3D loop antenna includes a first conductive portion having a length and width that substantially exceed a thickness of the first conductive portion and lie in a first plane. The first conductive portion is electrically coupled to a second conductive portion having a length and width that substantially exceed a thickness of the second conductive portion and lie in a second plane. The first and second planes are substantially parallel to one another. A current is excited through the first and second conductive portions in a current loop that lies in a third plane that is not substantially parallel to the first and second planes. In some instances, the third plane may be substantially perpendicular to the first and second planes.

The 3D loop antenna is configured such that when placed on a surface of an article the third plane defined by the current loop is not substantially parallel to the article surface to which the RFID tag is attached. In some embodiments, the third plane in which the current loop of the antenna lies may be substantially perpendicular to the article surface. In other words, one may think of the thicknesses of each of the conductive portions of the 3D loop antenna defining a plane that is substantially perpendicular to the article surface. It should be understood, however, that the 3D loop antenna may be oriented in any manner relative to the article surface so long as the third plane defined by the current loop of the 3D loop antenna is not substantially parallel to the article surface.

In some embodiments, the antenna is defined by a two-dimensional (2D) piece of electrically conductive material that is formed to define a 3D loop. The electrically conductive material has a length and width that substantially exceeds the thickness of the material, and may therefore be viewed as 2D. When formed to define the 3D loop, the electrically conductive material may be viewed as having a first conductive portion with a length and width lying in a first plane and a second conductive portion having a length and width lying in a second plane that is substantially parallel to the first plane.

In other embodiments, the 3D loop antenna is defined by a 2D piece of conductive material that is formed to define a portion of a loop and a conductive surface to which the RFID tag is attached defines the remainder of the loop. The 2D piece of conductive material couples to the conductive surface to form the 3D loop. The coupling may be an electrical coupling, e.g., a direct physical electrical connection, or an electromagnetic coupling. In this manner, at least a portion of the electrically conductive article surface forms the 3D loop antenna. In any case, the 3D loop antenna forms a closed circuit through which electrical current continuously flows when the 3D antenna is energized by an RF signal.

In this way, unlike dipole or other 2D antennas well known in the art in which current flows in a plane that is substantially parallel to the article surface to which the antenna is attached, the 3D loop antenna is oriented such that the 3D loop antenna may not experience the adverse effects attributable to an electrically conductive article surface. The 3D loop antenna, for example, may not experience a substantially diminished read range when attached to or positioned in near contact with an electrically conductive article surface. Rather, when energized by an interrogating RF signal, the 3D loop antenna may induce image currents in the conductive surface that enhance the read range of the 3D loop antenna, i.e., create a electromagnetic field that constructively adds to the field generated by the 3D loop antenna. That is, when the 3D loop antenna is in direct contact or near contact with an electrically conductive article surface, the article surface may act as a ground plane that mirrors or images electromagnetic elements near it. Due to the orientation of RFID tag 20 relative to the conductive article surface, as illustrated in FIGS. 2A, 2B, 3A and 3B, the mirrored or imaged current does not cancel the field radiated by the 3D loop antenna, but instead, enhances the field radiated by the 3D loop antenna. Thus, the electrically conductive article surface mirrors the electrical current flowing through the 3D loop antenna resulting in a "virtual antenna" that is approximately twice the size of the 3D loop antenna. The "virtual antenna" includes the 3D loop antenna and the mirrored or imaged current loop.

Regardless of whether the 3D antenna is defined by a piece of conductive material or by a piece of conductive material and a conductive surface on which the RFID tag is placed, the 3D loop antenna does not induce an electromagnetic field in the conductive surface that cancels the field created by the current loop, i.e., the 3D loop antenna. In fact, the image currents induced in the conductive surface create a field that enhances the field created by the current loop formed by the 3D loop antenna. Consequently, RFID tags 14 may have an increased read range greater than would otherwise be possible with other 2D or 3D antennas known in the art, without significantly increasing the transmit power of the interrogator. The read range of RFID tags 14 may, for example, be greater than approximately ten feet (greater than approximately 3 meters) while the transmit power of the interrogator remains relatively constant. It should be understood, however, that other read ranges are possible. Other example read ranges include a read range of less than approximately one foot (approximately thirty centimeters) and a read range of approximately one foot to approximately ten feet (approximately thirty centimeters to approximately three meters).

Figure 2A:
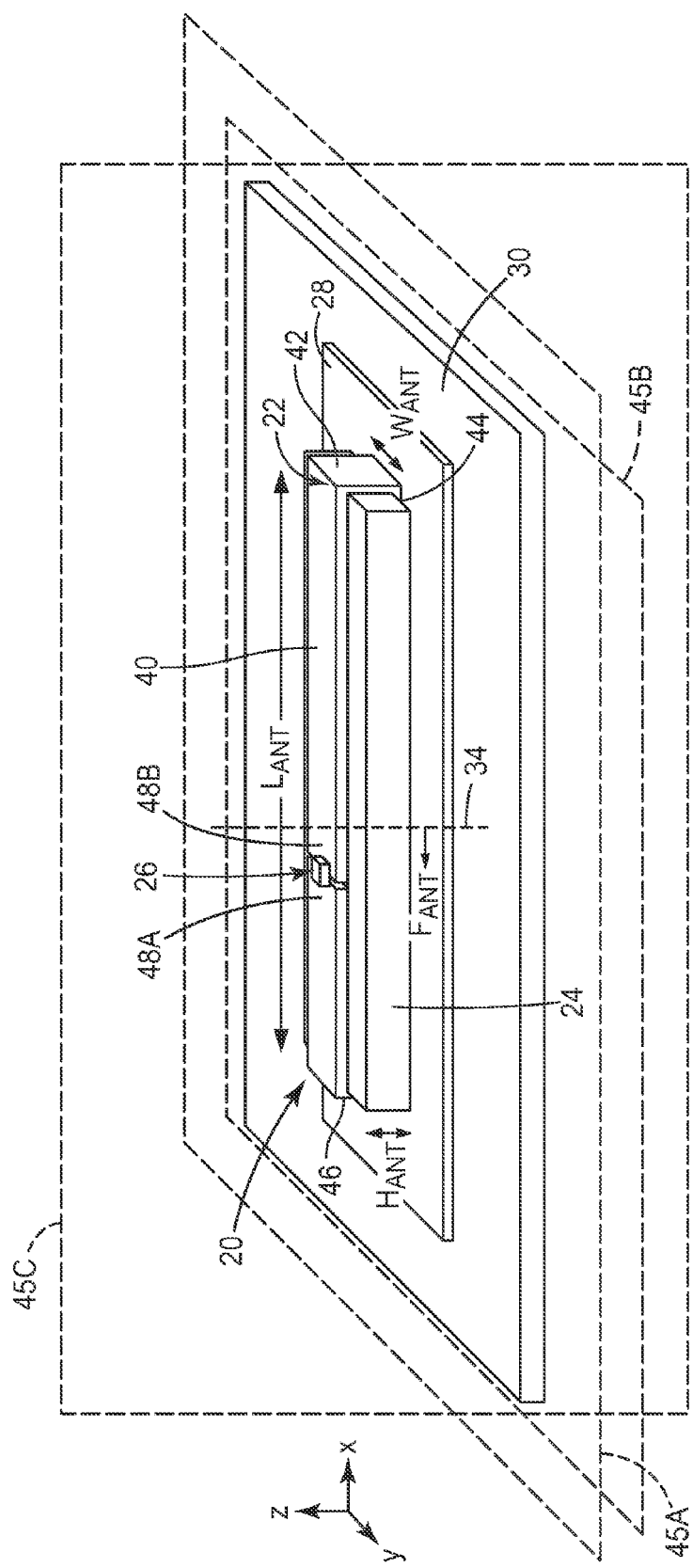
FIG. 2A is a schematic perspective view of one embodiment of an RFID tag in accordance with the invention, which includes a 3D antenna, a spacer layer, an IC chip.

FIG. 2A is a schematic perspective view of an example RFID tag 20 that includes 3D loop antenna 22, spacer material 24, and IC chip 26. RFID tag 20 is placed on article surface 28. Although not shown in FIG. 2A, RFID tag 20 may include an outer layer that helps to protect IC chip 26 and antenna 22 from contaminants, such as environmental debris. The outer layer may also be rigid to help protect IC chip 26 and 3D loop antenna 22 from physical damage. The outer layer may be formed of any suitable material, such as a rigid material (e.g., glass or ceramic) or a flexible material (e.g., polyimide). In other embodiments, the outer layer may also extend over sides 42 and 46 and, thus, completely encase RFID tag 20.

IC chip 26 is electrically coupled to 3D loop antenna 22 via opposite ends 48A and 48B of the 2D strip of conductive material that forms antenna 22. For example, IC chip 26 may be coupled to antenna 22, i.e., ends 48A and 48B, either directly or by using vias or crossovers, and may be embedded within RFID tag 20 or mounted as a surface mounted device (SMD).

IC chip 26 may include firmware and/or circuitry to store within RFID tag 20 unique identification and other desirable information, interpret and process commands received from the interrogation hardware, respond to requests for information by the interrogator (e.g., reader 16 of FIG. 1), and to resolve conflicts resulting from multiple tags responding to interrogation simultaneously. Optionally, IC chip 26 may be responsive to commands (read/write) for updating the information stored in an internal memory as opposed to merely reading the information (read only). Integrated circuits suitable for use in IC chip 26 of RFID tag 20 include those available from Texas Instruments located in Dallas, Tex. (i.e., the Gen 2 IC line of products), NXP Semiconductors located in Eindhoven, Netherlands (i.e., the I-CODE line of products), and ST Microelectronics located in Geneva, Switzerland, among others. Although RFID tag 20 is described as including an IC chip, other RFID circuitry may be used in addition to, or instead of, IC chip 26. For example, RFID tag 20 may include a surface acoustic wave (SAW), an organic circuit, or other RFID identification element, or a combination thereof.

In the example shown in FIG. 2A, 3D loop antenna 22 includes a first conductive portion 40 having a length and width that substantially exceed a thickness of the first conductive portion. First conductive portion 40 lies in a first plane 45A. In the example illustrated in FIG. 2A, first plane 45A lies in the x-y plane. Loop antenna 22 also includes a second conductive portion 44 having a length and width that substantially exceed a thickness of the second conductive portion. Second conductive portion 44 lies in a second plane 45B that is substantially parallel to first plane 45A. More specifically, second plane 45B also lies in substantially in the x-y plane. First conductive portion 40 is electrically coupled to second conductive portion 44 via conductive portions 42 and 46. Thus, conductive portions 40, 42, 44 and 46 are electrically coupled to form a closed loop. In some embodiments, conductive portions 40, 42, 44, and 46 are formed from a single 2D strip of electrically conductive material wrapped around spacer material 24 to define a loop. In other embodiments, conductive portions 40, 42, 44, and 46 may be made of more than one 2D strip.

The example of FIG. 2A illustrates 3D loop antenna 22 as being a generally rectangular loop. Conductive portions 40, 42, 44, and 46 define a rectangular space that is substantially filled by spacer material 24. Conductive portions 40 and 44 are substantially parallel to each other and generally define sides of the substantially rectangular loop. Conductive portions 40 and 44 have a length, which is measured along the x-axis direction, and a width, which is measured in the y-axis direction. In the example illustrated in FIG. 2A, conductive portion 44 and conductive portion 40 have the same length and width. However, in other embodiments, conductive portion 40 may be longer than conductive portion 44, conductive portion 44 may be longer than conductive portion 40, conductive portion 44 may be wider than conductive portion 40 or conductive portion 40 may be wider than conductive portion 44.

Conductive portions 42 and 46, which couple conductive portions 40 and 44, define sides of the rectangular loop that are substantially perpendicular to conductive portions 40 and 44, and thus planes 45A and 45B. Sides 42 and 46 are substantially parallel to each other and each have a length generally equal to the height of RFID tag 20, which is measured along the z-axis. Conductive portions 42 and 46 also have a width measured along the y-axis direction. In some embodiments, the length and width of conductive portions 42 and 46 are substantially larger than a thickness of the respective conductive portions.

Although described as a substantially rectangular loop antenna, 3D loop antenna 22 of RFID tag 20 may be modified such that 3D loop antenna 22 defines a greater or fewer number of sides, thus taking on different shapes. For example, conductive portions 40 and 44 may not be substantially parallel to one another or conductive portions 42 and 46 may not be substantially parallel to one another or both.

Figure 2B:
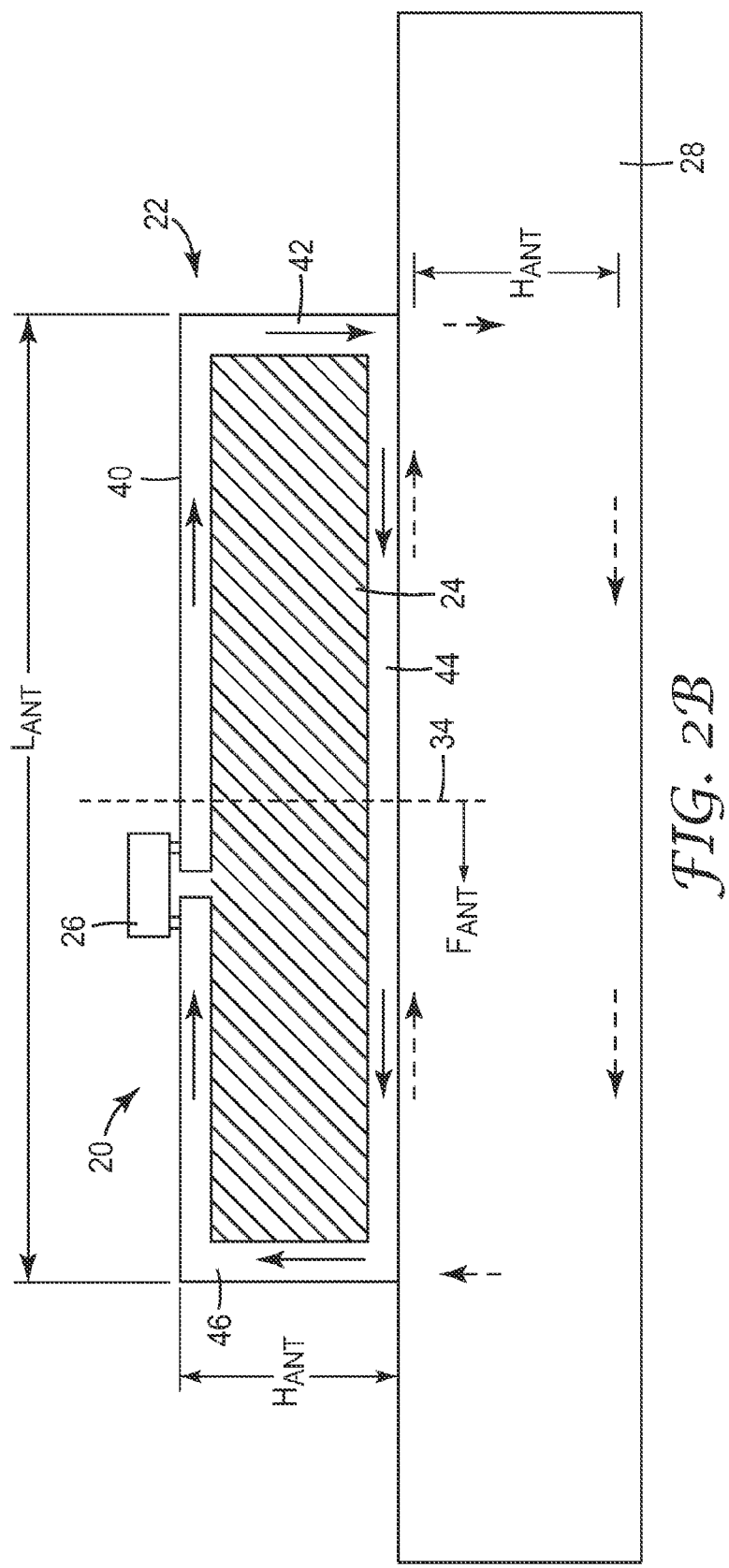
FIG. 2B is a cross-sectional view of the RFID tag of FIG. 2.

Regardless of the number of sides, however, 3D loop antenna 22 may substantially define a closed loop through which electrical current continuously flows to form a closed circuit when energized by an RF signal, e.g., RF signal 18 (FIG. 1). In particular, IC chip 26 excites a current through conductive portions 40, 42, 44 and 46 in a current loop that lies in a third plane 45C. The current loop through conductive portions 40, 42, 44 and 46 is represented in FIG. 2B by solid arrows in conductive portions 40, 42, 44 and 46. As illustrated, third plane 45C in which the current loop lies is not substantially parallel to first plane 45A and second plane 45B. In some embodiments, the third plane 45C may be substantially perpendicular to first plane 45A and second plane 45B.

In the example illustrated in FIG. 2A, RFID tag 20 is configured such that when placed on surface 28 of article 30, the first plane 45A and second plane 45B are substantially parallel to surface 28 of article 30. In this manner, current loop that defines third plane 45C is substantially perpendicular to article surface 28. However, the planes 45A, 45B and 45C may be oriented in other positions such that third plane 45C, i.e., the current loop that defines the third plane 45C, is not substantially parallel to article surface 28 to which the RFID tag is attached, but still forms an angle with article surface 28. That is, 3D loop antenna 22 may be oriented in any configuration such that plane 45C is not substantially parallel to article surface 28. It may generally be desirable, however, to orient 3D loop antenna 22 such that plane 45C is substantially perpendicular to article surface 28 because this configuration may achieve the largest read range. Orienting 3D loop antenna 22 such that plane 45C is substantially parallel to article surface 28 may not be desirable because such a configuration does not cause image currents in article surface 28 that constructively add to field generated by 3D loop antenna 22.

Article surface 28 may be a planar or non-planer surface of an article. In the example shown in FIG. 2A, article surface 28 is a planar surface. In some instances, article surface 28 is an electrically conductive material, such as, but not limited to, metallic materials including copper, aluminum, magnetic metals and metal alloys, such as Permalloy, graphite composites, and other materials that are electrically conductive. RFID tag 20 may be attached to article surface 28 by an adhesive (not shown). The adhesive may be formed of any suitable adhesive, which may depend on the particular application of RFID tag 20. For example, in some embodiments, the adhesive may be a pressure sensitive adhesive or tape. In alternate embodiments, RFID tag 20 may be attached to article surface 28 with a mounting member or other suitable mode of attachment. FIGS. 9-12 illustrate example mounting members that may be used for attaching RFID tag 20 to a generally non-planar surface.

In any case, RFID tag 20 may be attached to article surface 28 such that 3D loop antenna 22 electromagnetically interacts with article surface 28. In FIG. 2A, a conductive adhesive may be used to attach RFID tag 20 to article surface 28. As a result, when 3D loop antenna 22 is energized by an RF signal, electrical currents within article surface 28 may enhance the field radiated by antenna 22. In particular, the current excited through 3D loop antenna 22 induces one or more currents on article surface 28 on which the RFID tag is placed. For example, the current that flows through conductive portion 44 may induce a current on article surface 28. The current induced on article surface 28 is represented in FIG. 2B by the dashed arrows within article surface 28.

The induced currents on article surface 28 radiate an electromagnetic field. Unlike conventional antenna configurations in which the induced current cancels at least a portion of the antenna's field, 3D loop antenna 22 is oriented such that the induced current on article surface 28 does not cancel portions of the field radiated by 3D loop antenna 22. More specifically, the induced current on article surface 28 does not cancel the field radiated by 3D loop antenna 22 because the current loop that defines the third plane is not substantially parallel to the plane of article surface 28. In fact, in some instances the field radiated by 3D loop antenna 22 may actually be enhanced by the field generated by the induced current in article surface 28 due to the orientation of 3D loop antenna 22. For example, article surface 28 may act as a ground plane that mirrors or images 3D loop antenna 22. As will be described in more detail with respect to FIG. 2B, the current loop formed by 3D loop antenna 22 and electrically conductive surface 28 define a "virtual antenna" that is approximately twice the actual size of 3D loop antenna 22. That is, the magnitude of the field created by antenna 22 is approximately increased.

As previously described, some 2D and 3D antenna geometries well known in the art may exhibit prohibitively limited read ranges when attached to an electrically conductive surface. The electrical currents induced in article surface 28 by 3D loop antenna 22, however, enable RFID tag 20 to have an increased read range compared to many other 2D and 3D antenna geometries known in the art. Experimental results demonstrating the read ranges for RFID tags similar to RFID tag 20 are presented below in Table 1.

The length $L_{ANT}$, width $W_{ANT}$, and height $H_{ANT}$ of 3D loop antenna 22 may be selected to increase the effect of the enhanced field created by 3D loop antenna 22. In other words, length $L_{ANT}$, width $W_{ANT}$, and height $H_{ANT}$ affect a read range of RFID tag 20. Thus, a particular read range of 3D loop antenna 22 may be optimized at a particular range of length $L_{ANT}$, width $W_{ANT}$, and height $H_{ANT}$. In some embodiments, such as embodiments in which size is not a paramount design parameter, the length $L_{ANT}$ may be selected to be in a range of approximately one quarter of a wavelength to approximately half a wavelength of the operating frequency of tag 20. Using 915 MHz as an example, the length $L_{ANT}$ may be selected to be in a range of approximately 0.5 inches to approximately 6 inches (approximately 1 centimeters to approximately 15 centimeters). The width $W_{ANT}$ may generally be selected proportional to the length and/or with other guidelines in mind. Again, using 915 MHz as an example, width $W_{ANT}$ may be selected in a range of approximately 0.25 inches to approximately 1.5 inches (approximately 6 millimeters to approximately 40 millimeters). In some embodiments, the length and width of the conductive portions that form 3D loop antenna are substantially larger than a thicknesses of the conductive portions. In the example illustrated in FIG. 2A, conductive portion 40 and 44 have a length equal to antenna length $L_{ANT}$ and a width equal to antenna width $W_{ANT}$. Example thicknesses of conductive portion 40 and 44, as well as 42 and 46, may be in a range of approximately 0.00025 inches to approximately 0.04 inches (approximately 0.006 mm to 1 mm) and, more preferably, approximately 0.001 inches to 0.01 inches (approximately 0.025 mm to 0.25 mm).

Height $H_{ANT}$ of 3D loop antenna 22 depends upon many factors, including the height of spacer material 24 disposed between conductive portions 40 and 44. Height $H_{ANT}$ may be selected such that RFID tag 20 does not protrude significantly from article surface 28 to which RFID tag 20 is attached. If RFID tag 20 protrudes significantly from article surface 28, RFID tag 20 and/or antenna 22 may be vulnerable to damage. Height $H_{ANT}$ may also be selected such that 3D loop antenna 22 does not interfere significantly with components that are in close proximity to RFID tag 20. As an example, height $H_{ANT}$ may be in a range of approximately 0.02 inches to approximately 0.4 inches (approximately 0.5 millimeters to approximately 10 millimeters). It should be understood that other heights are possible.

For operating frequencies greater than 915 MHz, the length $L_{ANT}$ and height $H_{ANT}$ may decrease accordingly, and for operating frequencies less than 915 MHz, the length $L_{ANT}$ and height $H_{ANT}$ may increase accordingly. Therefore, it should be understood that these values are merely exemplary and should not be taken as limiting the scope of the present invention in any way. Further, although it is generally considered desirable for an RFID tag to be as small in size as possible, RFID tags described in this disclosure, such as RFID tag 20, may be constructed of any size suitable for the application.

Spacer material 24 may be formed of a solid material or a material consisting of mass particulate matter. Suitable spacer materials 24 include relatively light weight, electrically nonconductive materials, such as, but not limited to, polycarbonate. Another suitable spacer material could be a low loss magnetic material. RFID tag 20 may also be constructed without spacer material 24. That is, the center or hole of the 3D loop antenna 22 may be filled with air instead of a solid material. In this manner, air may act as a spacer material 24. Air may be desirable and particularly advantageous in applications such as aerospace and other transportation applications because of its relatively light weight compared to solid or mass particulate materials.

The specific properties of 3D loop antenna 22 depend on the desired operating frequency of the RFID tag 20. Antenna 22 receives radio frequency (RF) energy radiated by an interrogator (e.g., reader 16 of FIG. 1). For example, the RF signal emitted by the interrogator may be an ultra high frequency (UHF) RF signal, which typically refers to a frequency in a range of about 300 megahertz (MHz) to about 3 gigahertz (GHz). This RF energy carries both power and commands to RFID tag 20. In one embodiment, 3D loop antenna 22 collects RF energy from the interrogator and operates to convert the energy to power IC chip 26, which provides the response to be detected by the interrogator. Thus, the properties or characteristics, i.e., design parameters, of 3D loop antenna 22 should be matched to the system in which it is incorporated.

More specifically, in order to achieve increased power transfer, the impedance of 3D loop antenna 22 may be conjugately matched to the impedance of IC chip 26. Generally, silicon RFID IC chips have a low resistance and a large negative reactance. Thus, to achieve conjugate matching, 3D loop antenna 22 may be designed to have an equivalent resistance and an equal and opposite large positive reactance. However, when 3D loop antenna 22 is brought in close proximity, i.e., electromagnetic contact (or interaction) with an electrically conductive material, such as metals or liquids, the impedance of 3D loop antenna 22 is detuned, resulting in a loss of power transfer. With respect to 3D loop antenna 22, in particular, the impedance of 3D loop antenna 22 is changed when it is attached to a conductive surface, such as article surface 28.

The dimensions of 3D loop antenna 22, i.e., length $L_{ANT}$, width $W_{ANT}$, and height $H_{ANT}$, may be adjusted to match the impedance of 3D loop antenna 22 to the impedance of IC chip 26. In addition, a feedpoint $F_{ANT}$, which is the location on 3D loop antenna 22 at which IC chip 26 is coupled, may also be adjusted to change the impedance of 3D loop antenna 22 to better match the impedance of IC chip 26. As illustrated in FIG. 2, the feedpoint $F_{ANT}$ is measured between a center 34 of RFID tag 20, represented by the vertical dashed line in FIG. 2, and the location of IC chip 26. In some embodiments, the feedpoint $F_{ANT}$ may be adjusted such that IC chip 26 is directly connected to article surface 28. In this case, IC 26 is directly connected to ground. If the feedpoint $F_{ANT}$ was adjusted in this way in FIG. 2A, IC chip 26 would be illustrated as being positioned on side 42 or side 46. The impedance matching of 3D loop antenna 22 to that of IC chip 26 may be referred to as "tuning" of 3D loop antenna 22.

FIG. 2B is a cross-sectional view of RFID tag 20 in conjunction with article surface 28. Similar reference numbers reference similar features. As described above, RF signal 18 excites a current through 3D loop antenna 22, thus generating a current loop through conductive portions 40, 42, 44 and 46. The current loop through 3D loop antenna 22 is illustrated by the arrows. Article surface 28 may act as a ground plane if article surface 28 is reasonably large. Using image theory a representative electrical model of 3D loop antenna 22 can be created. Using the electrical model, it can be seen that due to article surface 28, the area of the current loop is approximately twice as large as the physical area of 3D loop antenna 22. In particular, the article surface 28 can enhance the area of the current loop which can enhance the overall radiation.

In another example, at least a portion of the 3D loop antenna is defined by a portion of the conductive article surface on which the RFID tag is attached. This example is illustrated in further detail in FIGS. 3A and 3B.

Figure 3A:
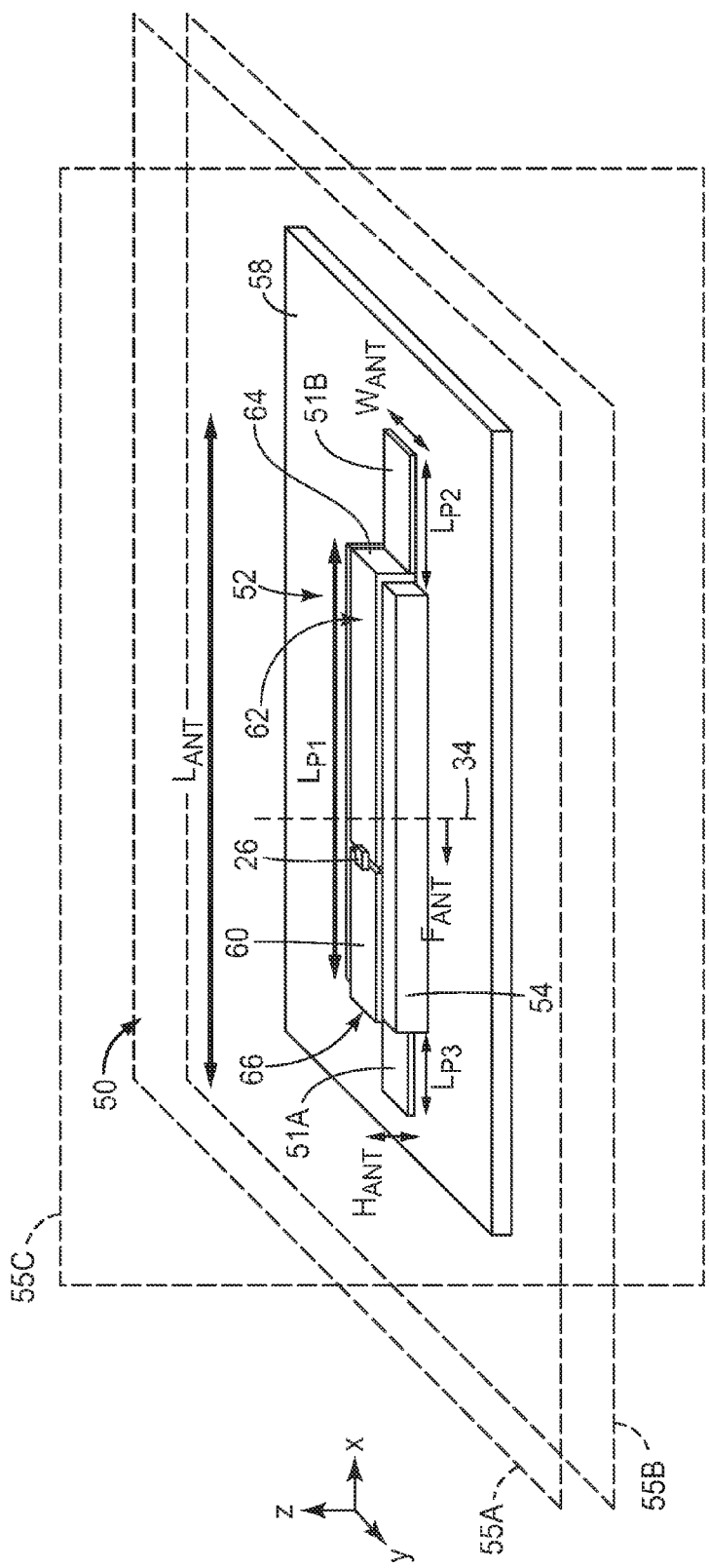
FIG. 3A is a schematic perspective view of another embodiment of an RFID tag in accordance with the invention.

FIG. 3A is a schematic perspective view of another example configuration for an RFID tag 50 that includes a 3D loop antenna 52. In FIG. 3A, RFID tag 50 includes 3D loop antenna 52, a spacer material 54, IC chip 26, and article surface 58. In general, RFID tag 50 operates in a similar manner as RFID tag 20 in FIG. 2. However, the configuration of RFID tag 50 differs from that of RFID tag 20. In particular, the 2D strip of electrically conductive material 60 in FIG. 3A does not wrap completely around spacer material 54. Instead, 2D strip 60 includes structures 51A and 51B on opposite ends of the 2D strip 60 that couple to article surface 58. In this manner, article surface 58 forms at least a portion of 3D loop antenna 52.

In one example, structures 51A and 51B may be directly connected to article surface 58, i.e., electrically connected to article surface 58. In another example, structures 51A and 51B may be indirectly connected to article surface 58, e.g., connected to article surface 58 via electromagnetic coupling. That is, structures 51A and 51B may "directly" contact article surface 58 in the former example, e.g., via a conductive adhesive, and contact surface 58 through electromagnetic coupling in the latter example, e.g., through a gap layer. The gap layer may, for example, comprise a non-conductive adhesive that forms an electrical "gap" between structures 51A, 51B and article surface 58. However, in both cases, at least a portion of 3D loop antenna 52 is formed by article surface 58 when RFID tag 50 is energized by an RF signal. More specifically, electrical current continuously flows through the 2D strip of conductive material 60 and a portion of article surface 58 to form a closed circuit.

As shown in FIG. 3A, 2D strip 60 may comprise two separate 2D strips electrically coupled to IC chip 26. However, in the interest of clarity, the two separate 2D strips may be collectively referred to as "2D strip 60" in this disclosure. In other embodiments, 2D strip of conductive material 60 may comprise a single continuous piece of conductive material. FIG. 3A illustrates 2D strip 60 as defining three conductive portions 62, 64, and 66 and structures 51A and 51B. In this disclosure, structures 51A and 51B may be referred to as "wings 51A and 51B" or "contact points." Conductive portions 62, 64, and 66 are positioned to wrap around spacer material 24 while leaving the bottom portion of spacer material 24 exposed to article surface 58. In this manner, conductive portions 62, 64, 66 and article surface 58 define a space that is substantially filled by spacer material 24 and conductive portions 66 and 64 each define planes that are substantially perpendicular to at least a portion of the plane of article surface 58. In some embodiments, article surface 58 may also include a curvilinear portion, in which case conductive portions 64 and 66 may not be substantially perpendicular to the entire article surface 58. As previously described with respect to FIG. 2, spacer material 24 may be air or a solid dielectric material, such as, but not limited to, polycarbonate.

First conductive portion 60 of 3D loop antenna 52 has a length and width that substantially exceed a thickness of first conductive portion 60. First conductive portion 60 lies in a first plane 55A. In the example illustrated in FIG. 2, first plane 55A lies in the x-y plane. Wings 51A and 51B of 3D loop antenna 52 also have a length and width that substantially exceed a thickness of wings 51A or 51B. Wings 51A and 51B lie in a second plane 55B that is substantially parallel to first plane 55A. More specifically, second plane 55B also lies substantially in the x-y plane. First conductive portion 62 is electrically coupled to wings 51A and 51B via conductive portion 66 and 64, respectively.

RF signal 18 excites a current through conductive portions 62, 64, and 66 and article surface 58 in a current loop 57A that lies in a third plane 55C. As illustrated, third plane 55C in which the current loop 57A lies is not substantially parallel to first plane 55A and second plane 55B. In some embodiments, the third plane 55C may be substantially perpendicular to first plane 55A and second plane 55B. In the example embodiment illustrated in FIG. 3A, third plane 55C lies in the x-z plane, which is perpendicular to the x-y plane.

In the example illustrated in FIG. 3, RFID tag 50 is configured such that when placed on article surface 58, the first plane 55A and second plane 55B are substantially parallel to article surface 58. In this manner, current loop 57A that defines third plane 55C is substantially perpendicular to article surface 58. However, the conductive portions may be oriented in other positions such that current loop 57A defines a third plane that is not substantially parallel to article surface 58 to which the RFID tag is attached, but still forms an angle with article surface 58. That is, 3D loop antenna 52 may be oriented in any configuration such that plane 55C is not substantially parallel to article surface 58. It may generally be desirable, however, to orient 3D loop antenna 52 such that plane 55C is substantially perpendicular to article surface 58 because this configuration may achieve the largest read range.

As shown in FIG. 3A, conductive portion 62 has a length $L_{P1}$ and is substantially parallel to article surface 58. The conductive portions that form wings 51A and 51B have lengths $L_{P2a}$ and $L_{P2b}$, respectively. Lengths $L_{P2a}$ and $L_{P2b}$ may, for example, be approximately, 0.5 inches and 1 inch. In the example, lengths $L_{P2a}$ and $L_{P2b}$ are of substantially equal lengths. In other embodiments, however, lengths $L_{P2a}$ and $L_{P2b}$ may be different lengths. Conductive portions 64 and 66 are substantially parallel to each other and have a length generally equal to height $H_{ANT}$. In other embodiments, conductive portions 64 and 66 may not be substantially parallel to one another. Conductive portions 62, 64, and 66 and wings 51A and 51B have uniform width $W_{ANT}$ measured along the y-axis direction. In other embodiments, however, the widths of any of conductive portions 62, 64, and 66, or wings 51A and 51B may vary. Wings 51A and 5lB extend beyond spacer material 24 on either side along the x-axis direction, and directly or electromagnetically couple 2D strip 60 to article surface 58. In this manner, wings 51A and 51B act as contact points that couple 2D strip 60 to article surface 58. When 2D strip 60 and article surface 58 are electromagnetically coupled to each other, each wing 51A and 51B serves as one side of a parallel plate capacitor with the other side being formed by the underlying portions of article surface 58. Wings 51A and 51B may be sized such that the capacitor approximates a short circuit or such that it forms another impedance tuning element. As described above with respect to FIG. 3, conductive portions 62, 64 and 66 and/or wings 51A and 51B may have varying widths and lengths.

The size of wings 51A and 51B, and particularly, the surface area that contacts article surface 58, may be selected based on the desired capacitance value. For example, Equations 1 and 2 below may be used to calculate the size of wings 51A, 51B necessary to achieve a particular capacitance value. The operating frequency may be input into Equation 1 along with a value for the impedance that is sufficient for achieving a short circuit. Equation 1 can then be solved for a capacitance value C. The calculated value for the capacitance value C can then be input into Equation 2 with the value for the dielectric constant and a distance, i.e. distance between one of wings 51A or 51B and surface 58. Equation 2 can then be solved for the area which can be used to design the size of wings 51A and 51B. Using an operating frequency of 915, for example, a capacitance of approximately 30 pico Farads (pF) or more may be desirable to approximate a short circuit.

$$(Z = 1/j\omega C) Z = \frac{1}{j\omega C} \qquad \text{Equation 1}$$

$$(C = \varepsilon A/D) C = \frac{\varepsilon A}{D} \qquad \text{Equation 2}$$

In the equations above, Z is a reactance, ω is a frequency in radians per second, C is a capacitance, A is an area of a capacitive plate, D is a distance between capacitive plates and ∈ is a dielectric constant of a gap.

Generally, RFID tag 50 operates in a manner similar to RFID tag 20. That is, when energized by an RF signal, electric current continuously flows through 3D loop antenna 52, e.g., 2D strip 60 and a portion of article surface 58 between wings 51A and 51B. However, not only does article surface 58 act as a portion of the 3D loop antenna, a current is induced in article surface 58. For example, article surface 58 again may act as a ground plane that mirrors or images the current in 2D strip 60. As will be described in more detail with respect to FIG. 3B, the current loop relative to article surface 58 results in a mirrored current enhancing the field radiated by 3D loop antenna 52. In this way, 3D loop antenna 52 operates as if it was approximately twice the size of 3D loop antenna 52. In other words, the magnitude of the resulting field is increased, thereby increasing the read range of 3D loop antenna 52.

Again, a particular length $L_{ANT}$, width $W_{ANT}$, and $H_{ANT}$ may be selected to tune 3D loop antenna 52. In addition, the length and width of conductive portions 62 ($L_{P1}$), 64, and 66 and wings 51A and 51B ($L_{P2a}$ and $L_{P2b}$) may be selected to tune 3D loop antenna 52. Spacer material 54 in RFID tag 50 may be the same as spacer material 24 used for RFID tag 20. Additionally, feedpoint $F_{ANT}$ may be adjusted to achieve the same read range but with a reduced length $L_{ANT}$ and/or thickness $H_{ANT}$ of the RFID tag 50. This is described in further detail below.

RFID tag 50 may be attached to article surface 58 in a manner similar to RFID tag 20. That is, an adhesive, such as a pressure sensitive adhesive, tape, or foam, may be attached to the lower portion of RFID tag 50 in order to secure it to surface 58. In some embodiments, the adhesive may applied to spacer material 54 and wings 51A and 51B. In other embodiments, however, the adhesive may be applied to spacer material 54 only. As previously described, the adhesive may be conductive thereby providing a direct electrical connection between 2D strip 60 and article surface 58. The adhesive may also be non-conductive thereby creating a capacitive coupling between 2D strip 60 and article surface 58. Alternatively, a mounting member or other mechanical means may be used to attach RFID tag 50 to surface 58. An example mounting member is described below.

RFID tags in accordance with the disclosure may also be useful for applications in which there is a desire to increase the read range and limited space in which to apply the RFID tag on the article, regardless of whether the article is conductive or nonconductive. For many applications, it is desirable to shorten the length and reduce the width of RFID tag 20 in order to accommodate a certain sized article or to otherwise limit the amount of article surface area consumed by a RFID tag. However, modifying the dimensions of a RFID tag in this manner may detune RFID tag for UHF applications by shifting the resonance to a higher frequency. The detuning of an RFID tag is shown in FIGS. 4A, 4B, 5A, and 5B. As discussed below with reference to FIGS. 4A, 4B, 5A, 5B, 6A, 6B, 7A, and 7B, experimental results indicated that RFID tags 14 may be retuned by adjusting the feedpoint $F_{ANT}$, which is measured between the center of an IC chip and a center 34 of the antenna (which is typically the center of the RFID tag) along the x-axis direction (along the length of the RFID tag). Therefore, 3D loop antenna may be shortened and/or made thinner while maintaining a relatively long read range, e.g., greater than approximately 10 feet (approximately 3 meters), by adjusting the feedpoint $F_{ANT}$. FIGS. 7A and 7B illustrate the performance of an RFID tag with various feedpoints.

In some embodiments, an RFID tag may be sized approximately equal to or less than a quarter wavelength of the operating frequency. Using an operating frequency of 915 MHz as an example, RFID tags may have a length equal to or less than approximately 1 cm while maintaining a good read range, even when attached to a conductive surface.

Figure 3B:
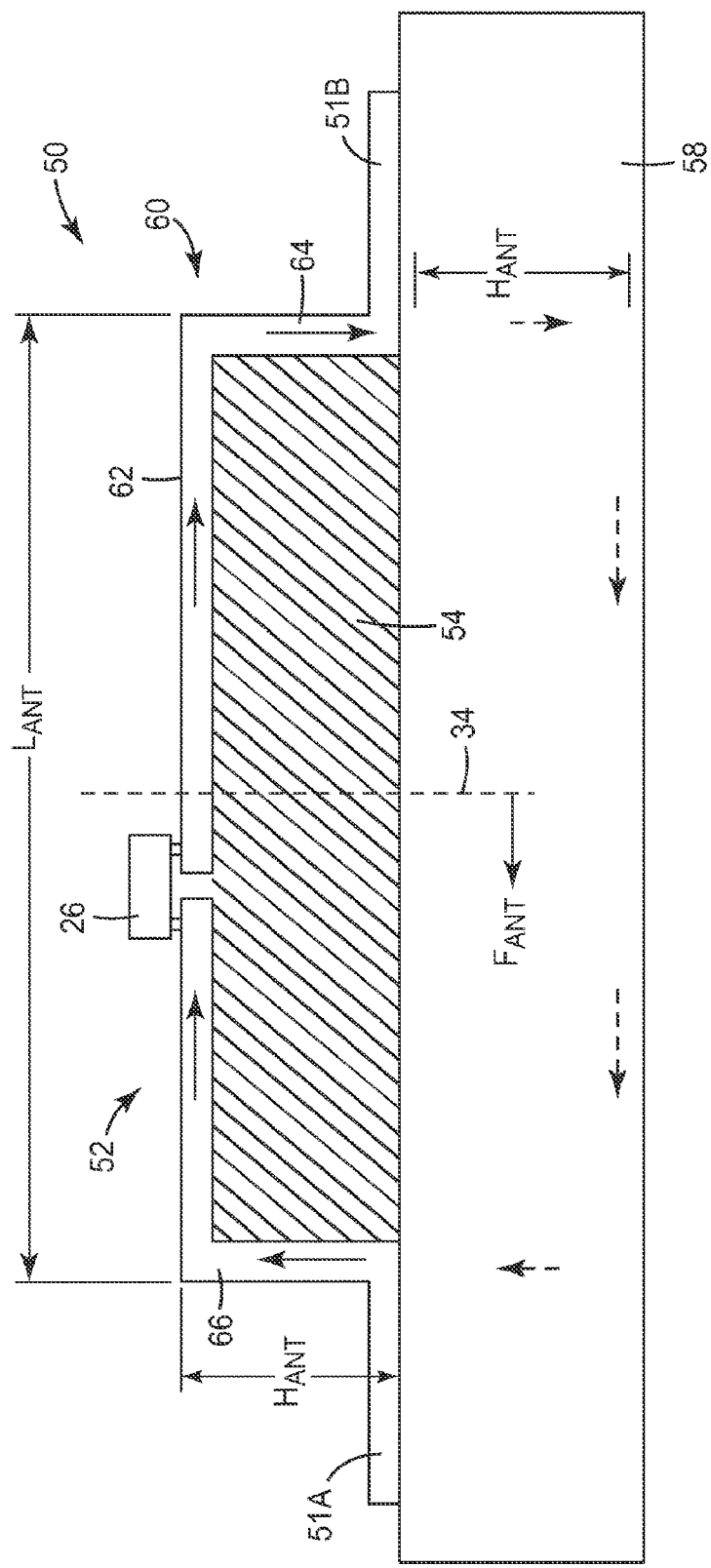
FIG. 3B is a cross-sectional view of the RFID tag of FIG. 3.

FIG. 3B is a cross-sectional view of RFID tag 50 in conjunction with article surface 58. Similar reference numbers reference similar features. As described above, conductive portions 62, 64, 66 and conductive article surface 58 form a closed loop. RF signal 18 excites a current through conductive portions 62, 64, 66, represented by the solid arrows. Article surface 58 may act as a ground plane if article surface 58 is reasonably large. Using image theory a representative electrical model of 3D loop antenna 22 can be created. Using the electrical model, it can be seen that due to article surface 58, the area of the current loop is approximately twice as large as the physical area of 3D loop antenna 22. In particular, the article surface 58 can enhance the area of the current loop which can enhance the overall radiation.

FIGS. 4A, 4B, 5A, 5B, 6A, 6B, 7A, and 7B are graphs demonstrating the tunable nature of an RFID tag in accordance with the invention, e.g., RFID tag 20 or RFID tag 50. These graphs present the real (resistance) and imaginary (reactance) parts of the antenna impedance (as seen by the IC) as a function of frequency. More specifically, FIGS. 4A-7B parameterize the length, width, height, and feedpoint of the loop antenna of the RFID tag, and provide parameters for designing an RFID tag exhibiting a desired balance between performance and size (i.e., the form factor). As described above, the length, width and height of the loop antenna may comprise various conductive portions (including conductive wings 51A and 51B) that have lengths and widths that can be adjusted to tune the loop antenna of the RFID tag. The graphs shown in FIGS. 4A-7B were generated using computer modeling with CST Microwave Studio software, available from Computer Simulation Technology of Wellesley Hills, Mass.

Figure 4A:
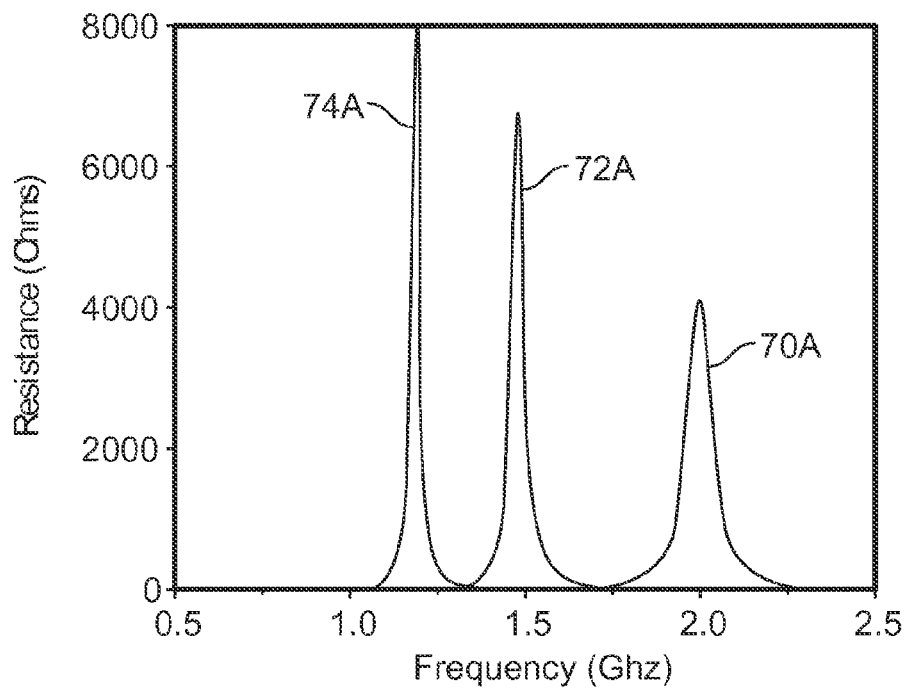
FIGS. 4A and 4B are graphs demonstrating a relationship between an impedance response of an antenna of an RFID tag and a length of the RFID tag.
Figure 4B:
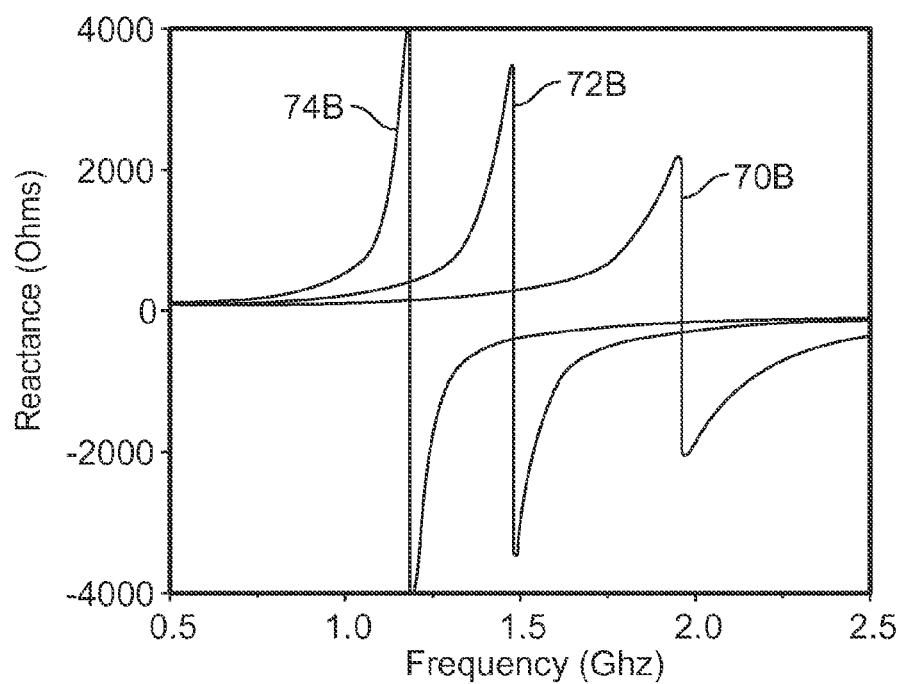

In particular, FIG. 4A illustrates example resistance curves 70A, 72A, and 74A for an RFID tag with a length $L_{ANT}$ of about 50 mm, about 75 mm, and about 100 mm, respectively. Curves 70B, 72B, and 74B in FIG. 4B are reactance curves for the RFID tag with a length $L_{ANT}$ equal to about 50 mm, about 75 mm, and about 100 mm, respectively. In this example, the RFID tag may be tuned to a particular impedance and designed to operate with a frequency of 915 MHz by varying $L_{ANT}$. Other parameters, e.g., width $W_{ANT}$, height $H_{ANT}$, and feedpoint $F_{ANT}$, are held constant for each curve in FIGS. 4A and 4B. Specifically, width $W_{ANT}$ is about 12.5 mm, height $H_{ANT}$ is about 5 mm, and feedpoint $F_{ANT}$ is about 0 mm (i.e., the IC chip is aligned with the center 34 of the 3D loop antenna). The curves shown in FIGS. 4A and 4B suggest that resonance shifts higher in frequency as the RFID tag is shortened.

Figure 5A:
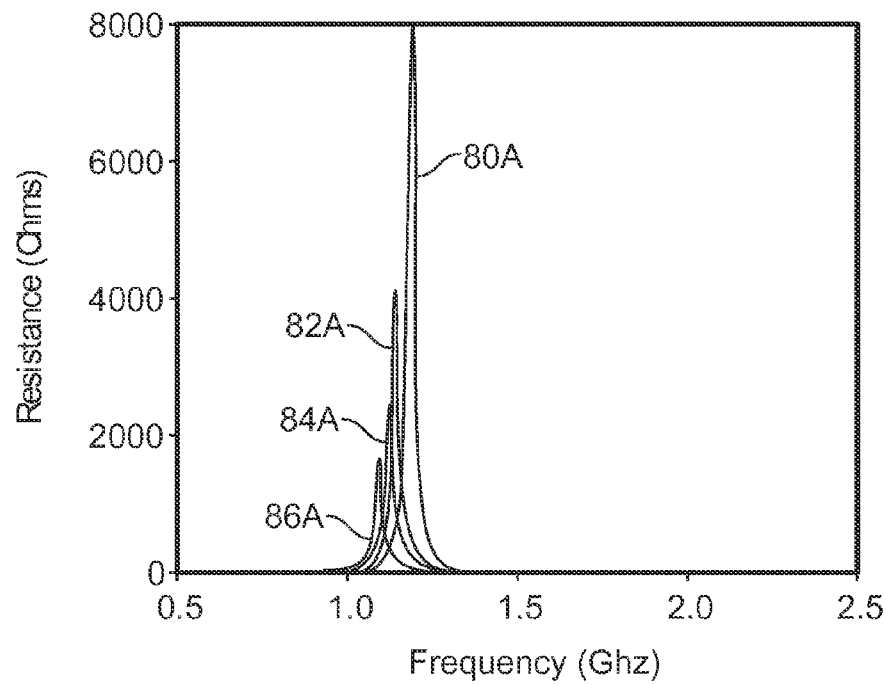
FIGS. 5A and 5B are graphs demonstrating a relationship between an impedance response of an antenna of an RFID tag and a width of the RFID tag.
Figure 5B:
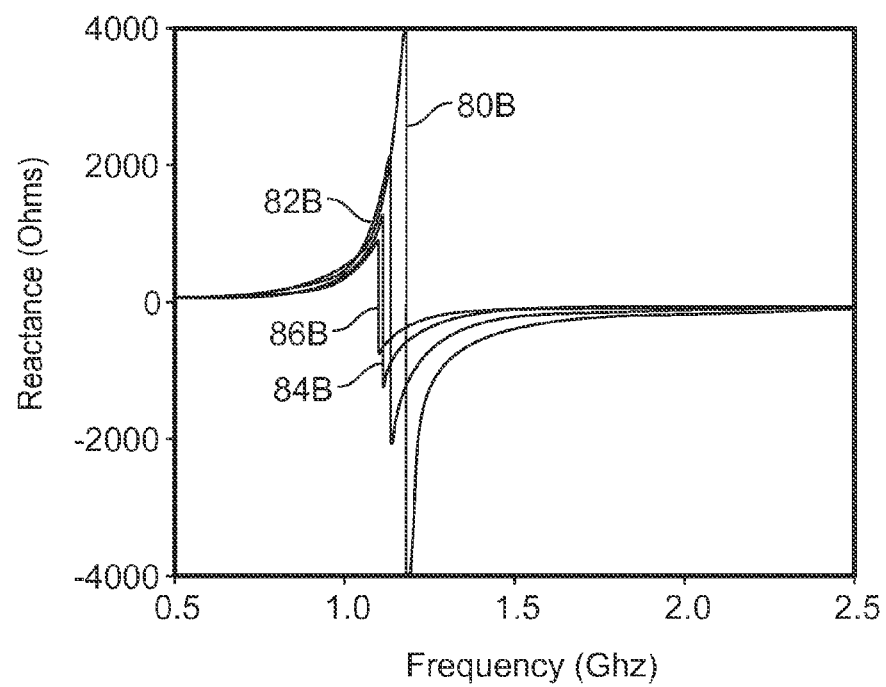

FIGS. 5A and 5B are graphs demonstrating example resistance and reactance curves that parameterize the width $W_{ANT}$ of an RFID tag in accordance with the invention. Curves 80A and 80B, 82A and 82B, 84A 84B, and 86A and 86B are resistance and reactance curves, respectively, for an RFID tag with a width $W_{ANT}$ equal to about 12.5 mm, about 25 mm, about 37.5 mm, and about 50 mm. The length $L_{ANT}$, height $H_{ANT}$, and feedpoint $F_{ANT}$ are about 100 mm, 5 mm, and 0 mm, respectively. Thus, the curves shown in FIGS. 5A and 5B suggest that decreasing the width of the RFID tag increases the slope, i.e., Q, of the resonance. The changing slope can be helpful for matching the impedance of the 3D loop antenna to different IC chip impedance values.

Figure 6A:
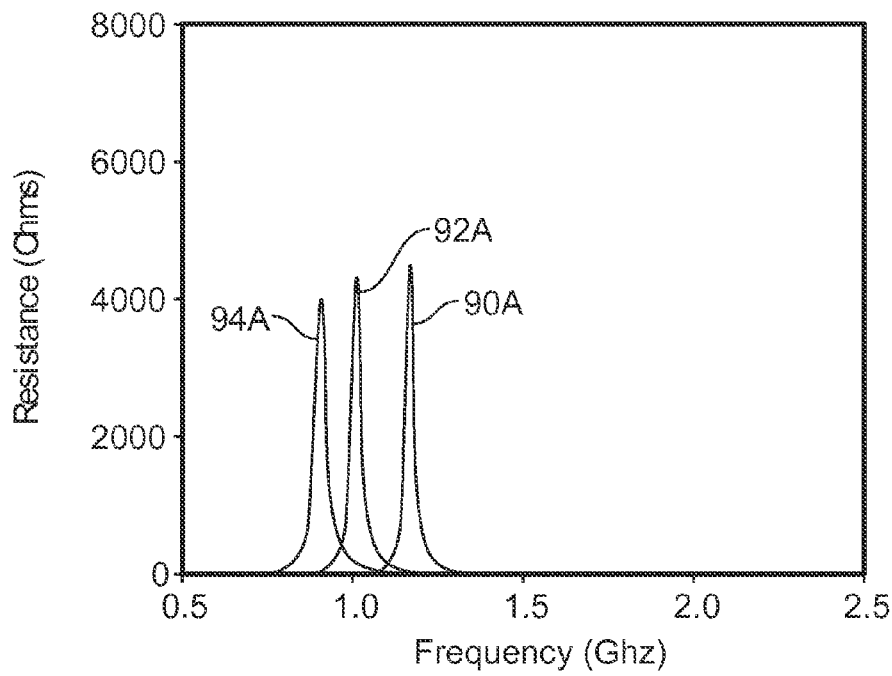
FIGS. 6A and 6B are graphs demonstrating a relationship between an impedance response of an antenna of an RFID tag and a height of the RFID tag.
Figure 6B:
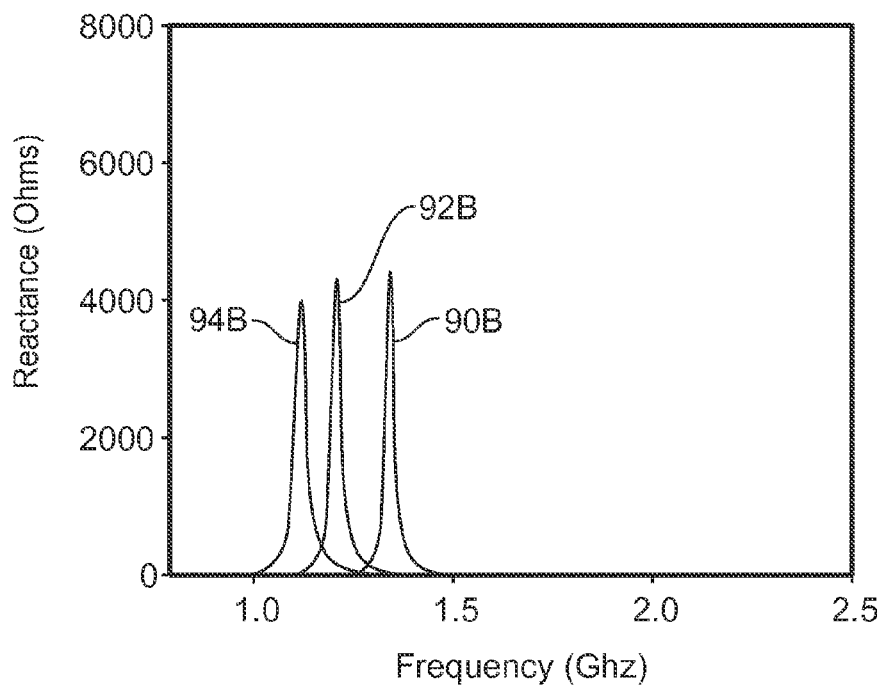
Figure 7A:
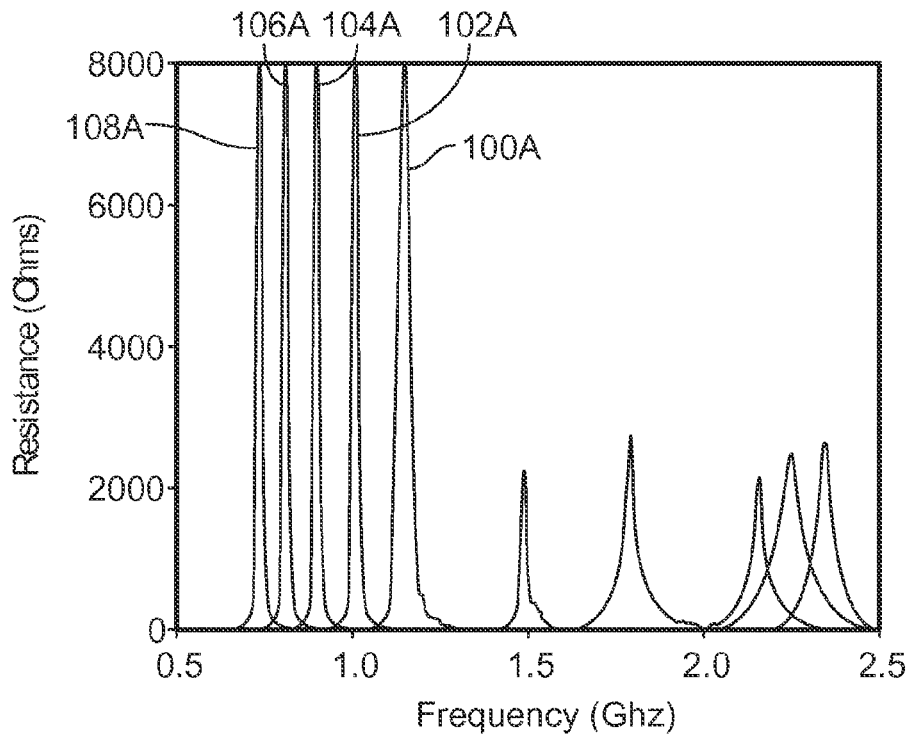
FIGS. 7A and 7B are graphs demonstrating a relationship between an impedance response of an antenna of an RFID tag and a feedpoint of the RFID tag.
Figure 7B:
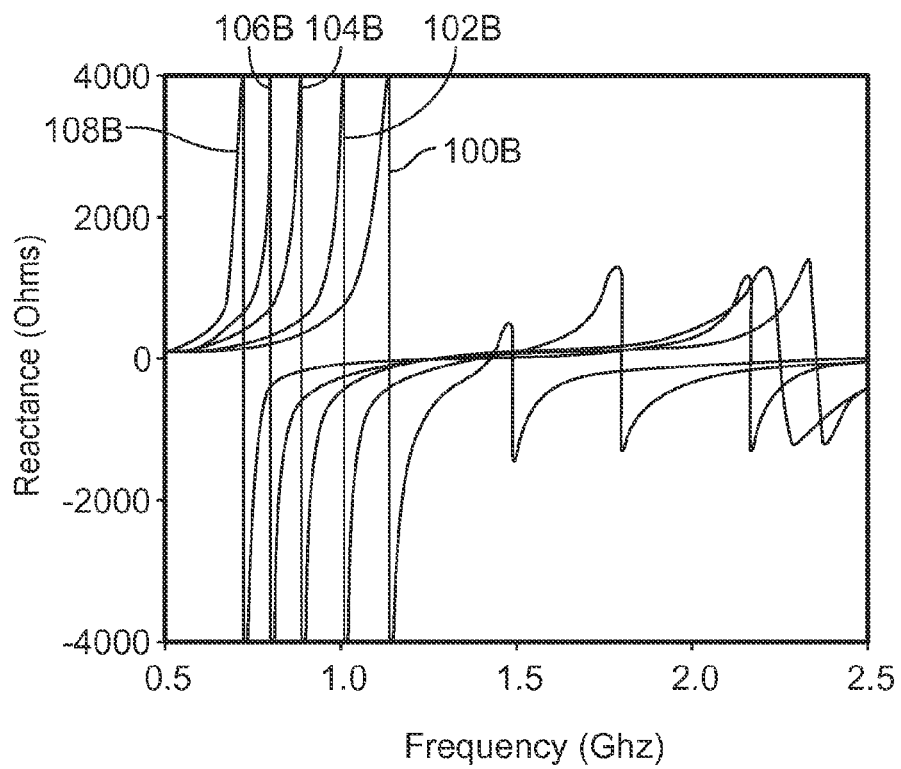

FIGS. 6A and 6B are graphs demonstrating example resistance and reactance curves that parameterize the height $H_{ANT}$ of an RFID tag in accordance with the invention. Curves 90A and 90B, 92A and 92B, and 94A and 94B are resistance and reactance curves, respectively, for an RFID tag with a height $H_{ANT}$ equal to about 2 mm, about 4 mm, and about 6 mm, respectively. The result of the computer modeling shown in FIGS. 6A and 6B suggests that decreasing the tag thickness shifts the resonance of the RFID tag higher in frequency.

FIGS. 7A and 7B are graphs demonstrating example resistance and reactance curves that parameterize the feedpoint $F_{ANT}$ of an RFID tag in accordance with the invention. In FIG. 7A, curves 100A, 102A, 104A, 106A, and 108A are resistance curves for an RFID tag with a feedpoint $F_{ANT}$ equal to about 5 mm, about 15 mm, about 25 mm, about 35 mm, and about 45 mm, respectively. In FIG. 7B, curves 100B, 102B, 104B, 106B, and 108B are reactance curves for an RFID tag with a feedpoint $F_{ANT}$ equal to about 5 mm, about 15 mm, about 25 mm, about 35 mm, and about 45 mm, respectively. The length $L_{ANT}$, width $W_{ANT}$, and height $H_{ANT}$ of the RFID are about 100 mm, about 12.5 mm, and about 5 mm, respectively. The graphs shown in FIGS. 7A and 7B suggest that increasing the feedpoint $F_{ANT}$ of the RFID tag decreases the first resonance of the RFID tag in frequency.

As previously described, it may be desirable in some applications to decrease the length $L_{ANT}$ and height $H_{ANT}$ of an RFID tag in order to accommodate attachment to relatively small articles or articles having limited space. In these applications, the space for attaching an RFID tag may be limited. However, as shown in FIGS. 4A-4B, and 6A-6B, decreasing the length $L_{ANT}$ and height $H_{ANT}$ of the RFID tag shifts the resonance higher in frequency, which may detune the RFID. However, as the graphs in FIGS. 7A, 7B suggest, adjusting the feedpoint $F_{ANT}$ can decrease the resonance to a lower frequency. Consequently, adverse effects from shortening and/or thinning an RFID tag may be mitigated by adjusting the feedpoint $F_{ANT}$.

Figure 8:
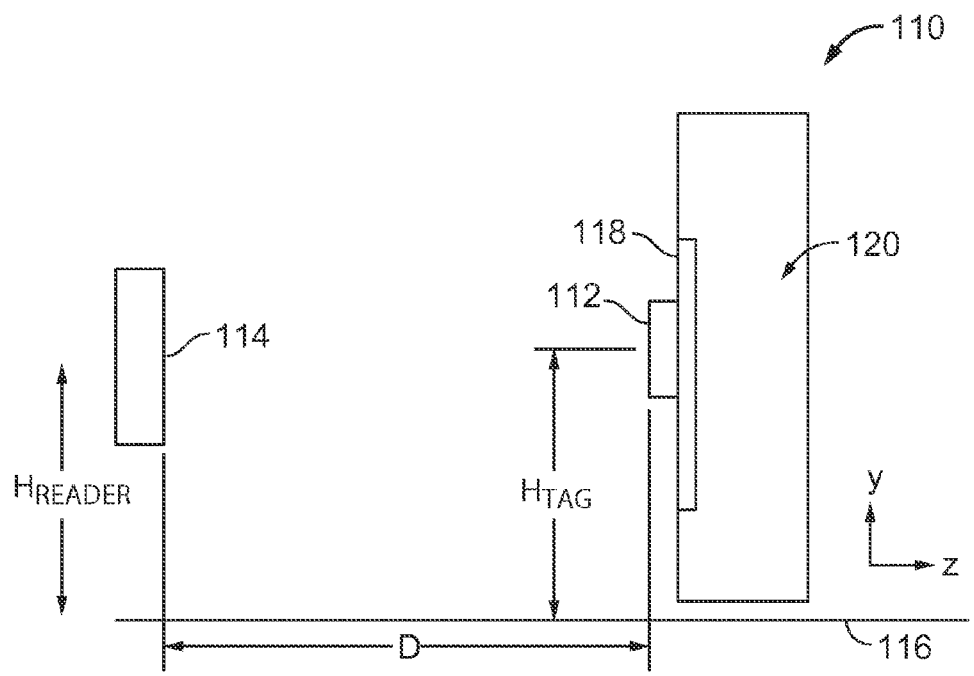
FIG. 8 is a schematic diagram of a testing system for testing a read range of an RFID tag.

FIG. 8 is a schematic diagram of testing system 110 for testing a read range of RFID tag 112. In general, testing environment 110 includes reader 114, which is mounted on a bracket height H above ground 116, RFID tag 112, test surface 118, and support 120. The experiments discussed below, were done in a small anechoic chamber. To prevent electromagnetic interference, the interior of the chamber was shielded with copper sheeting. On top of the copper sheeting, blue absorption cones were secured throughout the chamber to prevent electromagnetic reflections within the chamber. Reader 114 was placed at one end of the chamber and RFID tag 112 was placed at the other end of the chamber. The distance between reader 114 and RFID tag 112 was approximately 5 feet.

Different RFID tags were used in the experiments discussed below. The RFID tags were designed to verify the results of the parameterization of the length $L_{ANT}$, width $W_{ANT}$, height $H_{ANT}$, and feedpoint $F_{ANT}$ of an RFID tag comprising a 3D loop antenna shown in the graphs of FIGS. 5A-8B. For example, with respect to Experiment 1, five different RFID tags were used. Each of the RFID tags in this case was constructed with a configuration similar to that of RFID tag 20 in FIG. 2. Experiments 2-4 were conducted using a particular one of the RFID tags from Experiment 1. Experiment 5 was conducted using two RFID tags with a configuration similar to RFID tag 50 in FIG. 3A. In each of the experiments, all of the tags were created using a 5 mm thick foam core and an about 12.5 mm wide copper tape with a conductive adhesive on the back for attaching the tag to testing surface 138. The silicon IC chip used was a Phillips ISO 18000-6B packaged component.

Testing system 110 was used to test read ranges of RFID tag 112 on a conductive testing surface 138 and a nonconductive testing surface. A sheet of copper was used as a conducting surface. When testing RFID tag 112 on a conductive test surface, RFID tag 112 was attached to testing surface 138 using Double Stick Scotch™ Tape available from 3M Innovative Properties Company of St. Paul, Minn. To test the performance of RFID chip 112 on a nonconductive surface, RFID chip 112 was tested on a foam core, the properties of which are not significantly different than free space. Thus, the foam core approximates free space.

To determine the read range of RFID tag 112, the power level of reader 114 was set to a particular value and attenuated in increments of 1 dB until tag 112 was no longer readable. In particular, the power level of reader 114 was set to 31 dBm with a cable loss assumed to be 1 dB. Therefore, the resulting output power of reader 114 is 30 dBm. The conversion from attenuated power in dB to the theoretical expected range in feet is provided in equations 3 and 4 below.

$$\% \text{ read range} = \sqrt{10^{atten(dB)/10}} * 100 \quad (3)$$

$$\text{theoretical read range} = 5 \text{ ft.} * \sqrt{10^{atten(dB)/10}} \quad (4)$$

In this way, Experiments 1-5 determined whether reader 114 was able to read tag 112 at read range distances D in order to identify a maximum read range distance D for the particular RFID tag 112. Reader 114 provided a visual indicia to indicate whether RFID tag 112 was successfully energized and responsive to a read command.

Experiment 1

In Experiment 1, the read range of five different RFID tags, i.e., RFID tag A, RFID tag B, RFID tag C, RFID tag D, and RFID tag E was determined. Tag A was designed to be matched to the impedance of the silicon IC chip when placed on a metal surface. Tags B and C were designed similar to tag A except had different feedpoints $F_{ANT}$. Tags D and E were designed similar to tag A, but had different increased feedpoints $F_{ANT}$ and decreased lengths $L_{ANT}$ as compared to tag A. The results of Experiment 1 are provided in Table 1 below.

TABLE 1

| | Tag dimensions (mm) | | Tag on 6" × 8" metal plate | |
|---|---|---|---|---|
| | | | Z on metal | Read range D on metal |
| Tag Name | $L_{ANT}$ | $F_{ANT}$ | (ohms) | dB(ft.)-[m] |
| A | 100 | 0 | 27 + j422 | 7 (11.2)-[3.4] |
| B | 100 | 15 | 205 + j527 | 1 (5.6)-[1.7] |
| C | 100 | 23 | 250 − j460 | No read (<5)-[<1.5] |
| D | 87.5 | 13 | 27 + j324 | 12 (20)-[6.1] |
| E | 75 | 15 | 22 + j224 | 6 (10)-[3] |

As shown in Table 1, the read range for tag A was about 11.2 ft. The read range for tag B was observed to be about 5.6 ft. and the read range for tag C was observed to be less than about 5 feet. The read ranges of tags B and C were expected to be small because, as discussed above, adjusting the feedpoint $F_{ANT}$ detunes the tag by lowering the resonance of the tag. In contrast, tags D and E have exhibited relatively large read ranges, i.e., 20 ft. (6.1 meters) and 10 ft. (3 meters), respectively. This result is attributable to the increased feedpoint $F_{ANT}$ and decreased length $L_{ANT}$ of the tags. In fact, the read range of tag E is twice that of tag B even though the length of tag E is about 15 mm shorter. Thus, adjusting the feedpoint $F_{ANT}$ and length $L_{ANT}$ in this way resulted in restored tag tuning and read range. Additionally, it is important to note that tag D has a slightly smaller impedance value than tag A, but the read range exhibited by tag D is substantially greater than the read range of tag A.

Experiment 2

In Experiment 2, the steps of Experiment 1 were repeated using tags A-E on a foam core, the properties of which are not significantly different than free space, rather than on a conductive surface. Table 2 indicates that the impedance of RFID tag A changed substantially on the foam core as compared to the conductive surface. Accordingly, the read range of tag A decreased. The experimentation also shows that impedance of tag D in Experiment 1, i.e., tag D attached to a metal plate, and the impedance of tag E in Experiment 2 are approximately the same. The read range of tags D and E in each of the experiments is also similar. Thus, it may be concluded that an RFID tag can be designed to have nominally equal performance on a metal surface and in free space.

TABLE 2

| | Tag dimensions (mm) | | Tags on foam core | |
|---|---|---|---|---|
| | | | Z in free space | Read range in free |
| Tag Name | $L_{ANT}$ | $F_{ANT}$ | (ohms) | space dB(ft.)-[m] |
| A | 100 | 0 | 1170 − j521 | 4 (8)-[2.4] |
| B | 100 | 15 | 536 − j661 | 2 (6.3)-[1.9] |
| C | 100 | 23 | 51.6 − j377 | No read (<5)-[<1.5] |
| D | 87.5 | 13 | 131 + j621 | 3 (7)-[2.1] |
| E | 75 | 15 | 25.7 + j305 | 10 (15.8)-[4.8] |

Experiment 3

In Experiment 3, tag D, which exhibited the best performance in Experiment 1, was replicated and the steps of Experiment 1 were repeated for the original tag D and the two replicated tags, i.e., tag D1 and tag D3. In this case, tag D was secured to a 6"×8" metal plate with double stick tape and placed 5' from reader 114 at a height of 2'. The center of the read antenna was also position at a height 2' from ground 118. The replicated performance of tag D is shown in Table 3 below.

TABLE 3

| Tag | Impedance (ohms) | Read Range (ft.)-[m] |
|---|---|---|
| D (original) | 27 + j324 | 14 [4.3] |
| D1 (replicate) | 23 + j298 | 15 [4.6] |
| D3 (replicate) | 36 + j350 | 17 [5.2] |

The results given in Table 3 suggest that the impedance and the read ranges of the replicated tags were substantially similar to those of the original tag. In other words, the results obtained from further testing of replicate tags in Experiment 3 confirm the results of Experiment 1.

Experiment 4

In order to assess the robustness of tag D, the read range of tag D was measured on different sizes of metal plates. The plate sizes were rectangular and square and ranged in size from about 16 inches×16 inches to about 1 inch×4 inches (about 41 cm×41 cm to about 2.5 cm×10 cm). As shown in Table 4, the largest read range was about 35 ft. and the smaller read range achieved was 17 ft (about 5.2 meters). It can be observed from Table 4 that the larger read ranges were generally achieved with tag D attached to the larger metal plates and the smaller read ranges were generally achieved with tag D attached to the relatively smaller metal plates.

TABLE 4

| Plate Size (inch.)-[cm] | Atten dB (ft.)-[m] |
|---|---|
| 4 × 4 [10 × 10] | 12 (20)-[6.1] |
| 8 × 8 [20 × 20] | 16 (31.5)-[9.6] |
| 12 × 12 [30 × 30] | 11 (17.7)-[5.4] |
| 16 × 16 [41 × 41] | 15 (28)-[8.5] |
| 4 × 6 [10 × 15] | 17 (35)-[10.7] |
| 6 × 4 [15 × 10] | 11 (17)-[5.2] |
| 4 × 8 [10 × 20] | 17 (35)-[10.7] |
| 8 × 4 [20 × 10] | 16 (31.5)-[9.6] |
| 2 × 4 [5 × 10] | 15 (28)-[8.5] |
| 2 × 8 [5 × 20] | 17 (35)-[10.7] |
| 1 × 4 [2.5 × 10] | 12 (20)-[6.1] |
| 1 × 8 [2.5 × 20] | 12 (20)-[6.1] |
| 5 × 12 [13 × 30] | 15 (28)-[8.5] |
| 12 × 5 [30 × 13] | 17 (35)-[10.7] |

Experiment 5

The RFID tag used in this experiment was designed using a configuration similar to RFID tag 50 in FIG. 3A. That is, the RFID tag (labeled D2 in Table 5) includes "wings" to make electrical contact with the metal plate beneath the tag. In this design, the wings can directly contact the metal plate or contact the plate through capacitive coupling. In Table 5, the RFID tag with wings that directly contact the metal plate is labeled "D2 (wings)". This RFID tag was tested with two different IC chips of the same type and is labeled with "chip 1" and "chip 2", respectively. The variation in performance between D2-chip 1 and D2-chip 2 may be explained due to impedance variations between the IC chips.

Table 5 also includes results for an experimental set-up in which a dielectric spacer for capacitive coupling was positioned between the metal plate and the wings of the RFID tag. Post-It Notes, available from 3M Innovative Properties Company of St. Paul, Minn. were used as the dielectric spacers. The read range for the RFID tag including wings separated from the metal plate was substantially shorter than the read range for the RFID tags that directly contacted the metal plate. However, it is believed that the performance of the RFID tag including wings separated from the metal plate with dielectric spacers can be improved by designing the RFID tag for capacitive coupling. More specifically, the performance may be improved by adjusting the length $L_{ANT}$ and feedpoint $F_{ANT}$ to better match the impedance of the antenna to the impedance of the IC chip.

TABLE 5

| Tag | Impedance | Read Range dB (ft.)-[m] |
|---|---|---|
| D2 (wings) - chip 1 | 30 + j320 | 14 (25)-[7.6] |
| D2 (wings) - chip 2 | 30 + j320 | 16 (31.5)-[9.6] |
| D2 (wings) w/Post-It Notes ™ | 23 + j180 | 5 (9)-[2.7] |

Figure 9:
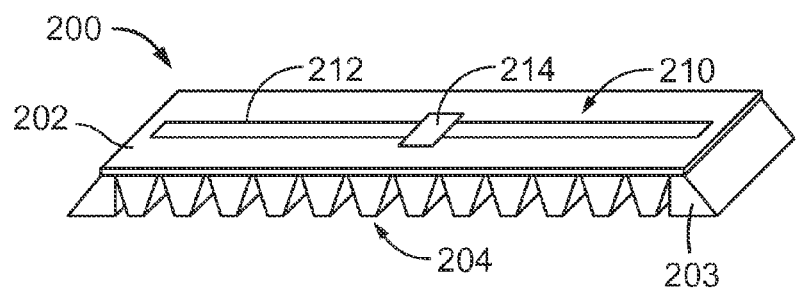
FIG. 9 is a perspective view of an exemplary mounting member for an RFID tag that enables the RFID tag to be attached to a substantially non-planar surface.

FIG. 9 is a perspective view of an exemplary mounting member 200 for attaching an RFID tag 210 to a substantially non-planar surface. In general, mounting member 200 is attached to a lower portion of RFID tag 210 and is flexible. The flexibility of mounting member 200 may enable mounting member 200 to conform to a substantially non-planar surface, such as a curved or irregularly shaped surface and support RFID tag 210 in the substantially non-planar form.

In order for the RFID tag 210 to function near a conductive surface, the structure should be designed so that the RFID tag is a sufficient distance from the conductive surface (or is made of an electrically nonconductive material between the tag and the surface). In either case, the mounting member separates the RFID tag from the surface by a distance. This distance may be referred to as the height or thickness of the mounting member and may be greater than approximately 5 mm.

Conventional mounting members are designed to attach an RFID tag to a relatively flat surface. A mounting member having a strip-like or beam-like shape may be suitable for attaching an RFID tag to a flat surface. However, this mounting member may not be suitable for attaching an RFID tag to a curved surface. For example, curving a conventional mounting member may cause internal forces within the structure that affect the integrity and shape of the mounting member, particularly within mounting members that have a substantial thickness. The problem is further exaggerated in structures that have an external shell/outer structure or flanges. Such structures transfer the stress from the bending movement into the side walls of the structure. This causes the side walls to wrinkle and flanges to buckle and bend.

A secondary problem is that thick structures have increased mass. This may be of particular importance in transportation systems because the added mass from the mounting member may result in reduced efficiency of the vehicle to which the RFID tag and structure are attached. The mass of the mounting member may be reduced by including foam or bubble filling the spacer materials of the mounting member, but at the same time may increase stress during bending. This stress concentration may cause cracking and failure of the mounting member and/or RFID tag.

Flexible mounting structure 200 in FIG. 9, however, may be useful for attaching RFID tag 210 to a non-planar surface. As shown in FIG. 9, mounting member 200 is attached to RFID tag 210 which includes an antenna 212 and an IC chip 214. In general, RFID tag 210 may be any type of RFID tag. As an example, antenna 212 may be a 3D loop antenna as described in this disclosure. In another example, antenna 212 may be a 2D or 3D antenna well known in the RFID arts. An adhesive, such as a pressure sensitive adhesive or a curable resin, may be used to secure RFID tag 210 to surface 202 of mounting member 200.

In FIG. 9, mounting member 200 includes surface 202 (which may also be referred to as a base member) and spacer material 203 attached to surface 202. Spacer material 203 is separated into a plurality of sections 204 (i.e., mounting structures) that are shaped and/or spaced apart from each other to promote flexibility while also reducing weight of mounting member 200. In the illustrated example, surface 202 may be a different material than spacer material 203. In this case, surface 202 may be made of a flexible material that does not limit the flexibility provided by sections 204 and each of sections 204 may be separately attached to surface 202. In other examples, spacer material 203 may form both sections 204 and surface 202. That is, spacer material 203 may be shaped to define a substantially flat top surface 202 to which RFID tag 210 is attached and a bottom surface defined by the exposed surfaces of sections 204 that attach to the article surface. Consequently, sections 204 may be formed in spacer material 203 in this case, e.g., by embossing, molding, or otherwise shaping spacer material 203 into a form having sections 204.

Mounting member 200 may generally be sized to provide sufficient support for RFID tag 210. For example, surface 202 may define a surface area so that RFID tag 210 can be completely positioned on mounting member 200. In one embodiment, mounting member 200 may extend beyond the outer perimeter of tag 210. However, the design of mounting member 200 shown in FIG. 9 is merely exemplary and should not be taken as limiting in any way. Rather, mounting member 200 may have any shape and size and include any of a variety of features that promote flexibility and/or reduced weight, such as ribbed structures that extend along or across RFID tag 210, a channeled structure, and other features or structures that promote flexibility for attaching RFID tag 210 to a non-planar surface.

FIGS. 10A and 10B illustrate an exemplary configuration for a mounting member 220. In particular, FIG. 10A illustrates a top plan view of mounting member 220 for attaching an RFID tag, such as RFID tag 210, to a substantially non-planar surface. The illustrated example in FIG. 10A provides a detailed view of the surface of mounting member 220 that attaches to an article surface. An RFID tag may be secured to the side of mounting member 220 that is opposite the surface shown in FIG. 10A. That is, the view shown in FIG. 10A may be a bottom surface of mounting member 220 for attaching to an article surface and an RFID tag may be attached to the top surface mounting member 220.

As shown in FIG. 10A, mounting member 220 includes a surface 224 and a plurality of structures 226 that protrude substantially perpendicular from surface 224. Structures 226 protrude substantially outward from surface 224, i.e., protrude substantially perpendicular to surface 224, and are spaced apart from each other. In particular, structures 226 may have a height that defines the thickness of mounting member 220. The height of structures 226 may be substantially larger than the thickness of surface 224. Generally, surface 224 may be substantially thinner than structures 226 while maintaining structural integrity, i.e., while retaining sufficient strength to prevent surface 224 from failing. In this way, surface 224 does not limit the flexibility afforded by structures 226.

As shown in FIG. 10A, each of structures 226 may be tapered between its base and top. That is, the surface area of structures 220 may be greater at the point where they attach to surface 224 than where they attach to an article. Because of the shape and spacing of structures 226, mounting member 220 may be manipulated in substantially any direction to conform to a curved or irregularly shaped surface. As an example, mounting member 220 may be manipulated to bend about its major axis or about its minor axis. In either case, this manipulation of mounting member 220 causes the space between structures 220 to decrease. Accordingly, the degree to which mounting member 220 can be bent may be defined by the shape of structures 220. Thus, the shape and spacing between structures 226, as well as the shape of the article surface to which structure 220 is to be attached, should be considered when designing structure 220.

FIG. 10B is a perspective view illustrating structure 226 in greater detail. Structure 226 may represent, for example, a configuration of each of structures 226 of mounting member 220 (FIG. 10A). In particular, FIG. 10B illustrates structure 226 detached from mounting member 220. Structure 226 defines six sides, i.e., 227A, 227B, 227C, 227D, 227E and 227F. Side 227A is normally attached to surface 224 of mounting member 220, but is exposed in FIG. 10B for illustrative purposes. Side 227B is substantially parallel to side 227A and is designed to attach to an article surface, e.g., via an adhesive. The distance between sides 227A and 227B defines a height $H_1$, which may define the thickness of mounting member 200 because, as discussed above, surface 224 has a relatively small thickness. As previously described the thickness of mounting member 220 may be selected to decouple the RFID tag from the electrically conductive surface to which it is attached via mounting member 220. In one embodiment, height $H_1$ may be greater than approximately 5 mm.

In the illustrated example, the area defined by side 227A is larger than the area defined by 227B. Consequently, sides 227C, 227D, 227E, and 227F are angled relative to each other so that structure 226 tapers from side 227A to 227B. Because each of structures 226 shares this shape, mounting member 220 can be manipulated to conform to a curved or irregularly shaped surface.

For example, mounting member 220 may be manipulated to conform to a convex or a concave surface. When mounting member 220 is manipulated to conform to a convex surface, the space between adjacent structures 226 is reduced. More specifically, mounting member 220 bends in on itself such that the bottom surfaces of structures 226 are brought closer together. On the other hand, if mounting member 220 is attached to a concave surface, mountings structure 220 bends such that the space between the bottom surfaces of adjacent structures 226 increases.

In another example, mounting member 220 may be attached to an irregularly shaped surface. The irregularly shaped surface may include more than one curved surface. For example, the surface may have an S-shape. In this case, a portion of mounting member 220 conforms to one of the curved surfaces and another portion of mounting member 220 conforms to the other curved surface. Importantly, structures 226 allow mounting member 220 to be manipulated to conform to an article surface regardless of the shape of the article surface. It should be noted that the RFID tag attached to mounting member 226 should also be designed to be flexible so that the tag can operate when it is attached to an article.

FIG. 11A is a plan view illustrating a mounting member 230 including a surface with ribbed structures 234 that promote flexibility for attaching an RFID tag, such as RFID tag 210, to a substantially non-planar surface. In general, mounting member 230 may be similar to mounting members 220 and 210 except for the configuration of the structures that provide flexibility to mounting member 230.

In FIG. 11A, structures 234 include a plurality of ribs or ridges that are parallel to each other and define a ribbed surface, where each of the structures 234 has a longitudinal axis 235 that extends substantially perpendicular to a length of an RFID tag. Structures 234 protrude substantially perpendicular from surface 232 and are spaced apart from each other. Similar to structures 226, structures 234 may be tapered such that a surface area of each structure 234 that contacts surface 232 is greater than a surface area of each structure 234 that contacts an article surface. The tapered shape of structures 234 and spacing between structures 234 promote flexibility of mounting member 230. Mounting member 230 is configured to bend along the length of structures 234, and may be bent until the tapered edges of structures 234 abut each other. Accordingly, mounting member 230 may be preferentially flexible in at least one direction, i.e., along the length of mounting structures 234.

FIG. 11B is a plan view illustrating a mounting member 240 similar to mounting member 230. Mounting member 240 is different from mounting member 230, however, because mounting member 240 includes ribbed structures 244 that define a ribbed surface, where a longitudinal axis 245 of each of the ribbed structures 244 extends along the length (i.e., substantially parallel to the length) of an RFID tag, instead of substantially perpendicular to the length of an RFID tag. In other words, ribbed structures 244 have tapered edges, and are spaced apart and substantially parallel to each other. Thus, mounting member 240 may be particularly flexible across the width of mounting member 240.

While FIGS. 11A and 11B illustrate mounting members including mounting structures that run substantially perpendicular to or substantially parallel to a length of an RFID tag that is attached to the mounting member, in other embodiments, the mounting structures may have another arrangement with respect to the RFID tag. For example, in one embodiment, the mounting structures may extend substantially diagonally (e.g., at an approximate 45 degree angle) to the length of the RFID tag.

FIG. 12 is a plan view illustrating a flexible mounting member 250 with a channeled structure 254 that may be useful for attaching an RFID tag to a substantially non-planar surface. As shown in FIG. 12, channeled structure 254 may be formed by a series of fingers that inter-digitate with each other. Again, these fingers may protrude substantially perpendicular from surface 252 and have tapered edges to promote flexibility of mounting member 250.

Mounting member 250 differs from mounting members 220, 230, and 240 in that the interior of mounting member 250 is enclosed. The interior may be enclosed by channeled structure 254 or an outer shell or layer. Enclosing the interior may provide one or more advantages. For example, injecting additional adhesive into the channels defined by channeled structure 254 may provide increased durability for holding a shape that conforms to the article surface. It should be noted that it may be possible to edge seal mounting member 200, 220, 230, and 240, i.e., enclose the interior of these mounting members, by placing a bead of epoxy around the edges of the mounting member while the mounting member is attached to the article surface and allowing the epoxy to cure. When the epoxy has cured, it effectively seals the edges between the article surface and the respective mounting member to protect the interior space between the mounting member and article surface from environmental damage that may affect the adhesive and cause the mounting member to fall off of the article surface.

Figure 13A:
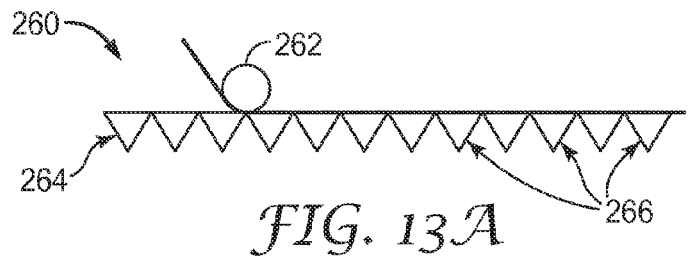
FIGS. 13A and 13B illustrate an example process for manufacturing RFID tags with a mounting member that enables the RFID tags to be attached to a substantially non-planar surface.
Figure 13B:
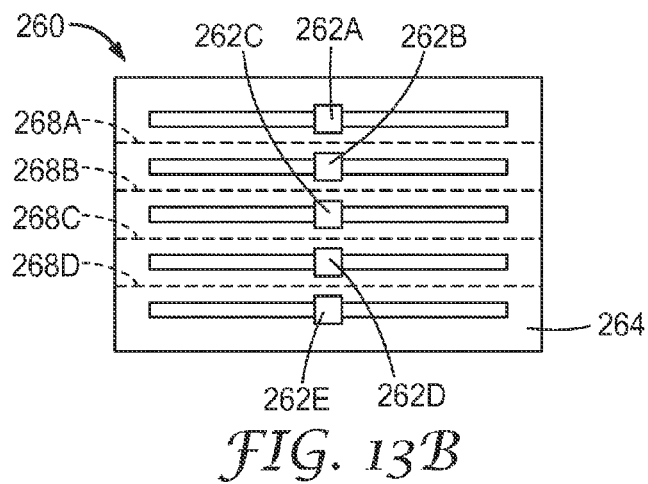

FIGS. 13A and 13B illustrate an example process for manufacturing RFID tags with a mounting member that enables the RFID tags to be attached to a substantially non-planar surface. In particular, FIG. 13A is a conceptual diagram illustrating a side view of a system 260 for manufacturing such RFID tags. In FIG. 13A, system 260 includes a mounting member 264 which includes structures 266 that promote flexibility and a roll of RFID tags 262. Mounting member 264 may be one of mountings structures 220, 230, 240, and 250 or any other conceivable mounting member including structures that promote flexibility. As previously discussed, mounting member 264 may be formed by a variety of processes, such as casting or embossing. The roll of RFID tags 262 may generally include a number of the same type of RFID tags, but may, in some cases include various different types of RFID tags. The RFID tags may be active or passive RFID tags and may include a 3D loop antenna as described in this disclosure or other conventional 2D or 3D antennas.

As shown in FIG. 13A, the roll of RFID tags 262 may be rolled over a top surface of mounting member 264 such that the underside of RFID tags 262 are placed on the top surface of mounting member 264. For example, the roll of RFID tags 262 may be applied to mounting member 264 such that a longitudinal axis of each of structures 266 runs along a width $W_{ANT}$ of the RFID tags as shown in FIG. 2. Alternatively, RFID tags 262 may be applied to mounting member 264 such that a longitudinal axis of each of structures 266 run along the length of RFID tags 262. In yet another example, structures 266 may be similar to structures 226. In this case, structures 266 may be substantially evenly spaced over the underside of RFID tags 262.

In any case, an adhesive may be applied to the top surface of mounting member 264 prior to rolling RFID tags 262 over mounting member 264 so that the adhesive secures RFID tags 262 to mounting member 264 as tags 262 are rolled onto mounting member 264. The adhesive may be a pressure sensitive adhesive or a curable resin. When the adhesive has set, RFID tags 262 may be cut from the structure into individual RFID tags and mounting member assemblies. Die cutting, laser cutting, or other known cutting methods or processes may be used to cut individual RFID tags from the structure.

FIG. 13B illustrates a top plan view of system 260. More specifically, FIG. 13B illustrates RFID tags 262A-E placed on top of mounting member 264. Dashed lines in FIG. 13B indicate paths for cutting RFID tags from the material.

FIGS. 14A-14E are conceptual diagrams illustrating another example process for manufacturing RFID tags with a mounting member that enables the RFID tags to be attached to a substantially non-planar surface. In particular, each of FIGS. 14A-14E illustrates a sequential step in the manufacturing process.

Figure 14A:
FIGS. 14A-14E are conceptual diagrams illustrating another example process for manufacturing RFID tags with a mounting member that enables the RFID tags to be attached to a substantially non-planar surface.
Figure 14B:
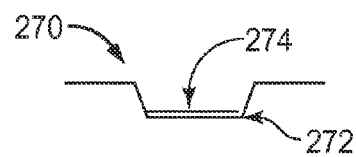
Figure 14C:
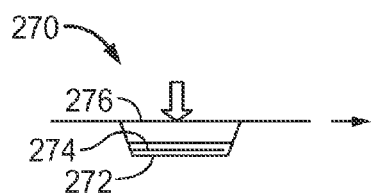

FIG. 14A is a conceptual diagram illustrating a cavity 270 for casting a mounting member for an RFID tag. FIG. 14B illustrates an RFID tag 274 placed inside cavity 270. In addition to RFID tag 274, any top or cover films that provide protection to RFID tag 274 may also be placed inside cavity 270 with RFID tag 274. When RFID tag 274 and any other protective films have been placed in cavity 270, cavity 270 may be filled with a curable resin 276 as shown in FIG. 14C. For example, cavity 270 may be filled using injection molding with a thermoplastic resin.

Figure 14D:
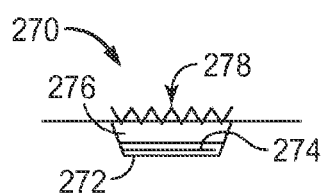

FIG. 14D illustrates a shaping tool 278 driven into resin 276. Shaping tool 278 may be pressed into resin 276 until resin 276 has set. Shaping tool 278 may be shaped to imprint structures that promote flexibility into resin 276. For example, shaping tool 278 may be shaped to imprint structures 226, 234, 244, or 254 into resin 276. Alternatively, shaping tool 278 may cut the structures 226, 234, 244, or 254 from resin 276 after resin 276 has cured.

Figure 14E:
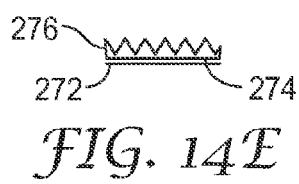

In FIG. 14E, resin 276 has set and shaping tool 278 has been removed. Thus, what remains in cavity 270 forms an RFID tag with a mounting member for attaching the RFID tag to a substantially non-planar surface. This manufacturing process may be particularly desirable if chemical resistance or other protection from environmental damage is desired for the RFID tag. In addition, this process allows the RFID tag and mounting member assembly to be finished with ribbed sections at the edges, which may not be able to be achieved when using the process described in FIGS. 13A and 13B.

Figure 15A:
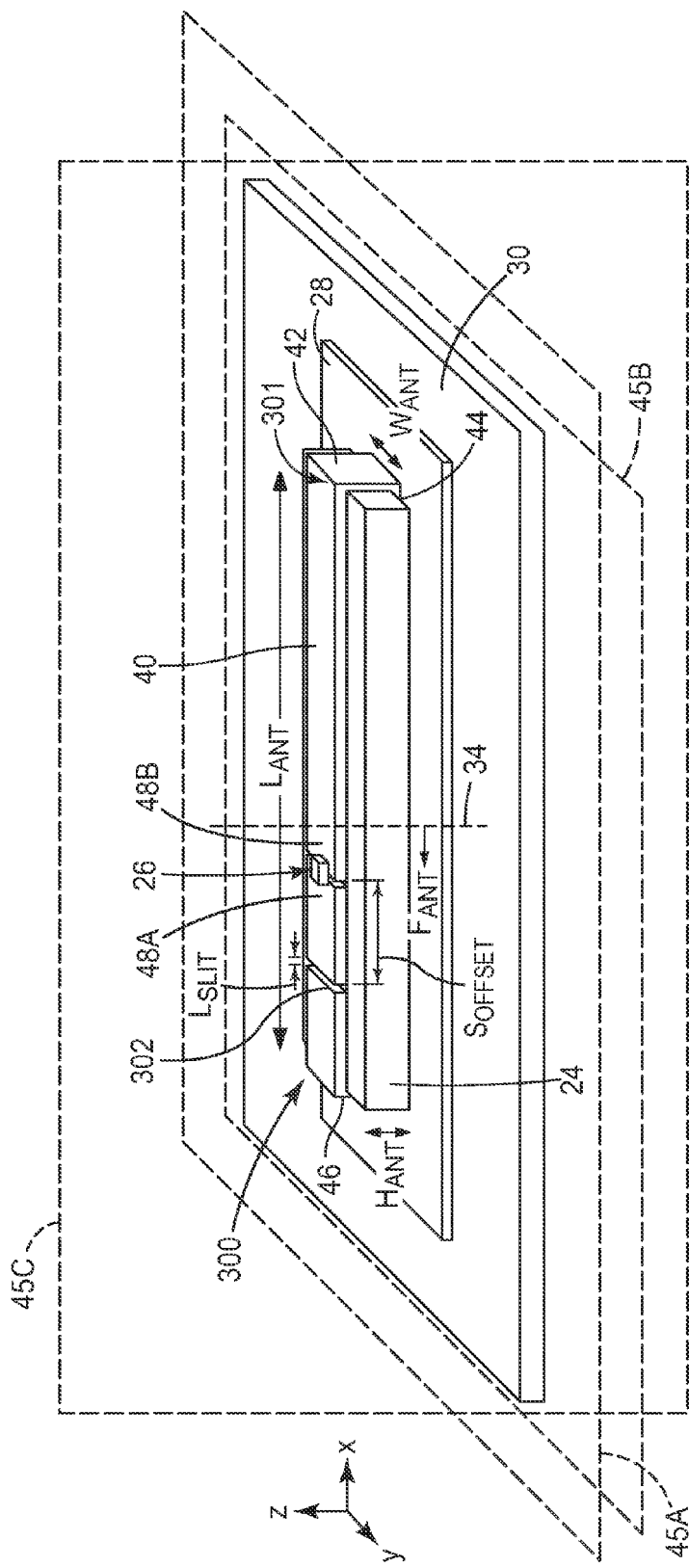
FIG. 15A is a schematic perspective view of an example RFID tag in accordance with this disclosure.

FIG. 15A is a schematic perspective view of an example RFID tag 300. RFID tag 300 conforms substantially with RFID tag 20 of FIG. 2A, but 3D loop antenna 301 of RFID tag 300 includes a slit 302 that functions as a tuning element. As illustrated in FIG. 15A, the feedpoint $F_{ANT}$ of 3D loop antenna 301, i.e., the point at which IC chip 26 couples to antenna 301, is offset from a center 34 of 3D loop antenna 301. As described above, the location of feedpoint $F_{ANT}$ may be adjusted to tune 3D loop antenna 301. In other words, the location of feedpoint $F_{ANT}$ may be adjusted to better match an impedance of 3D loop antenna 301 with an impedance of IC chip 26.

Additionally, slit 302 of 3D loop antenna 301 may act as a capacitive tuning element for further tuning of 3D loop antenna 22. Slit 302 is offset from IC chip 26 by a distance of $S_{OFFSET}$. Again, in the example illustrated in FIG. 15A, $S_{OFFSET}$ is in the negative x-direction from IC chip 26. Slit 302 has a length $L_{SLIT}$ that represents the length of the slit in x-direction. As such, slit 302 may be viewed as a gap in conductive portion 40 with a gap width equal to $L_{SLIT}$.

The length of slit 302, $L_{SLIT}$, and the distance that slit 302 is offset from IC chip 26, $S_{OFFSET}$, may be adjusted to tune 3D loop antenna 22. As will be described in further detail below, adjusting the length of slit 302, $L_{SLIT}$, and the distance that slit 302 is offset from IC chip 26, $S_{OFFSET}$, may be particularly effective in tuning an imaginary part of an impedance of 3D loop antenna 22, referred to as the reactance. Additionally, such adjustments may be used to finely tune a real part of the impedance of 3D loop antenna 22, referred to as the resistance. In one embodiment, the length of the slit $L_{SLIT}$ may be between approximately 0.5-5 mm and the offset of the slit from IC chip 26 may be between approximately 2-15 mm.

In the example illustrated in FIG. 15A, slit 302 is located on the shorter side of conductive portion 40. In other words, slit 302 is offset from IC chip 26 in the same directions as IC chip 26 is offset from center 34 of 3D loop antenna 301, e.g., in the negative x-direction in the example illustrated in FIG. 15A. Relocating slit 302 to the longer side of conductive portion 40 may cause a significant change in the response of 3D loop antenna 22. If the offset of IC chip 26 from center 34 of antenna 301, i.e., $F_{ANT}$, is in the negative x-direction, the longer portion of the antenna would be located in the positive x-direction from the offset IC chip 26. In this case, the resonance of 3D loop antenna 301 splits into a double resonance. In addition, as the offset increases, the resonance frequency moves to higher frequencies within the UHF frequency band. This increase in resonance frequency may be undesirable for some RFID applications.

Figure 15B:
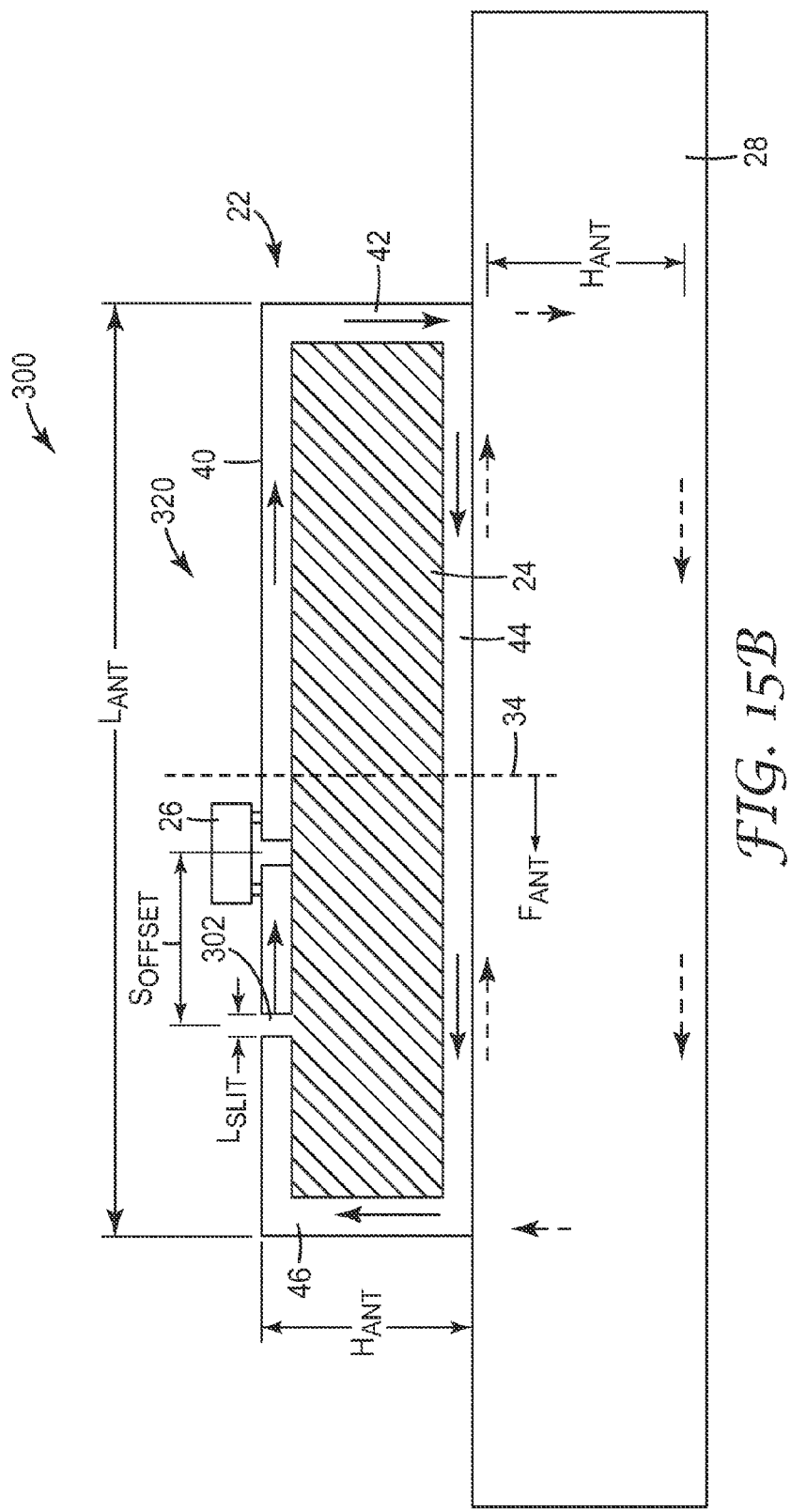
FIG. 15B is a cross-sectional view of the RFID tag of FIG. 15A.

FIG. 15B is a cross-sectional view of RFID tag 300 in conjunction with article surface 28. Similar reference numbers reference similar features. As described above, RF signal 18 excites a current through 3D loop antenna 301, thus generating a current loop through conductive portions 40, 42, 44 and 46. The current loop through 3D loop antenna 301 is illustrated by the arrows. Unlike the current loop through 3D loop antenna 22 of FIG. 2B in which there is no gap, the current loop through 3D loop antenna 301 traverses across a gap in the trace formed by slit 302. In particular, the thickness of conductive trace 40 on each side of the slit 302 may each act as a capacitive plate. The current excited through 3D loop antenna 301 causes the sides of slit 301, which act as plates of a capacitor, to charge and discharge as the alternating current (AC) excitation signal flows through 3D loop antenna 301. Thus, slit 302 functions as a capacitor that charges and discharge as the alternating current fluctuates, making it appear that the alternating current is flowing through unimpeded while still providing the tuning capabilities described above.

Although FIGS. 15A and 15B illustrate the use of slit 302 within an antenna similar to that shown in FIGS. 2A and 2B, one or more slits 302 may be added to other antenna structures, such as 3D loop antenna 50 illustrated in FIGS. 3A and 3B, to provide similar tuning capabilities. Furthermore, RFID tag 300 may include slit 302 for use in tuning 3D loop antenna 301 without the feedpoint $F_{ANT}$ of being offset from center 34 of antenna 301. In this case, IC chip 26 is located at center 34 of 3D loop antenna 301, i.e., $F_{ANT}=0$. Moreover, 3D loop antenna 301 may include more than one slit 302.

Figure 16A:
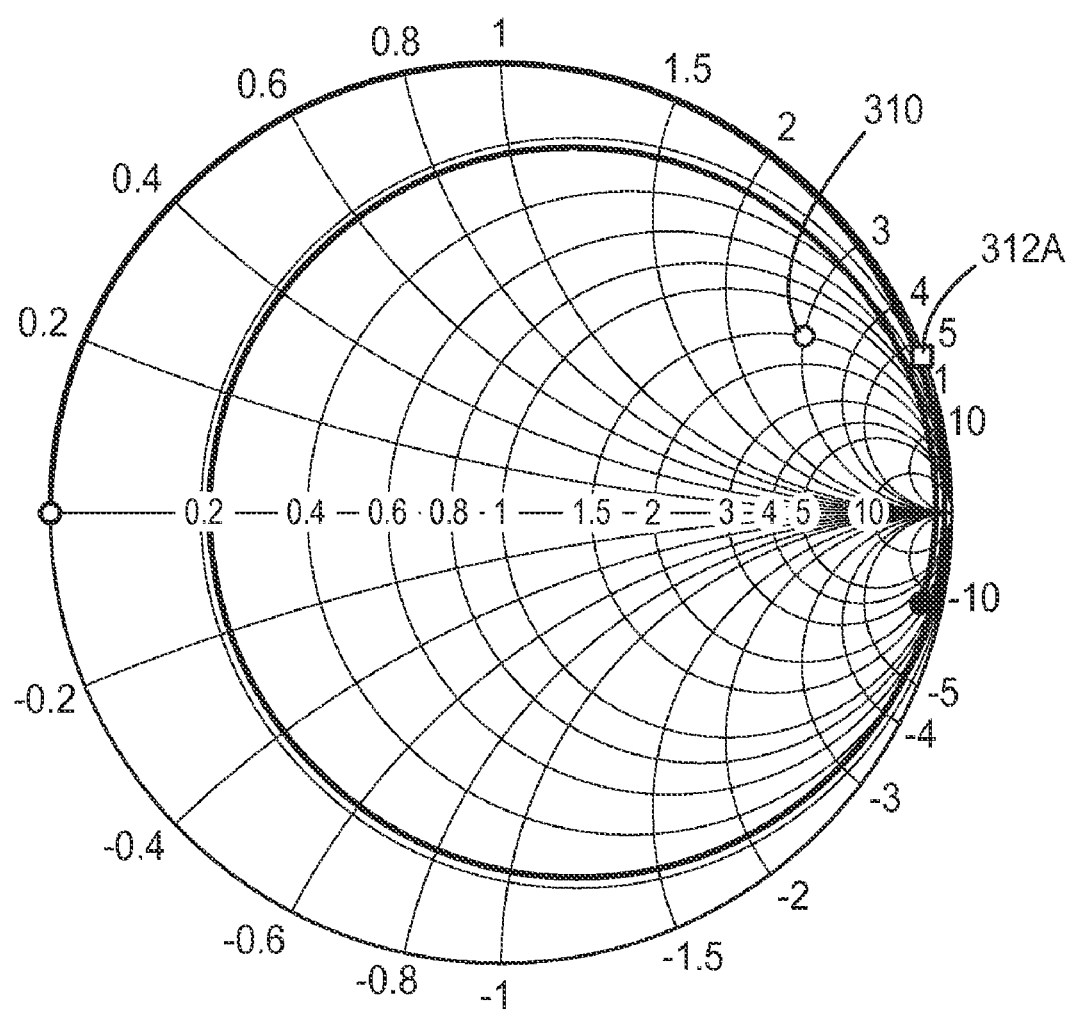
FIGS. 16A and 16B are Smith Charts that illustrate example total impedance of two antenna designs.
Figure 16B:
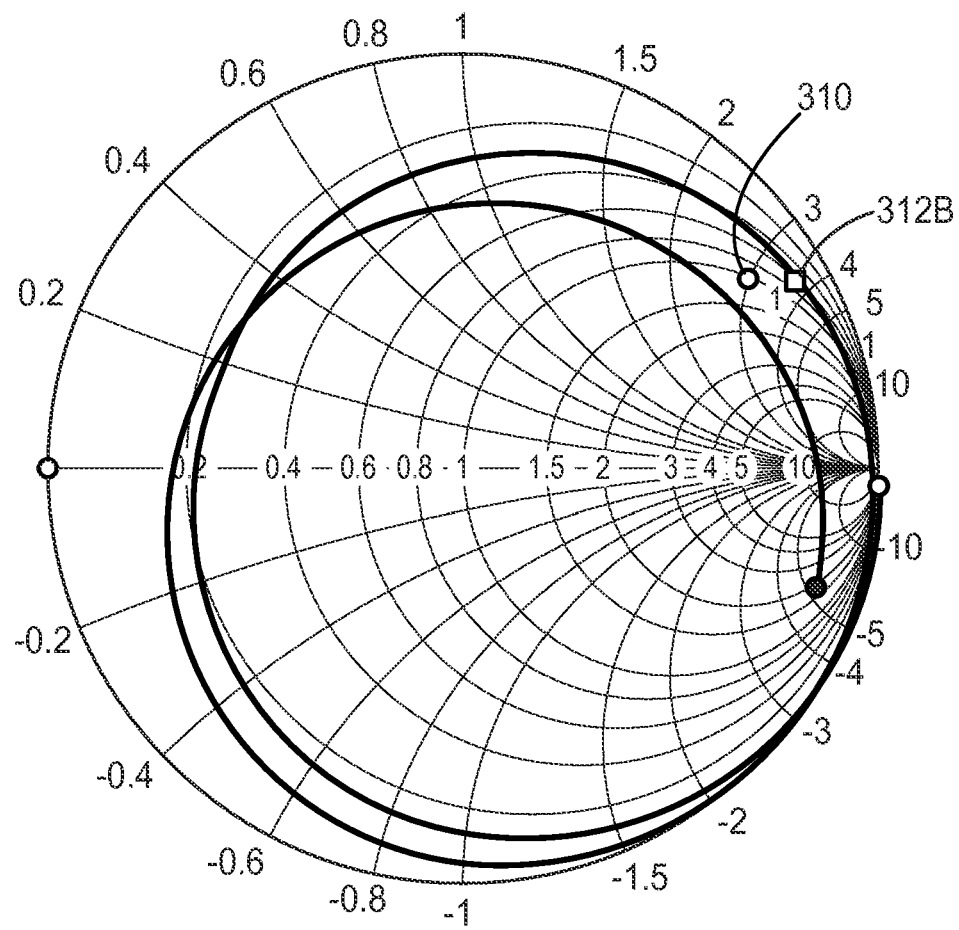

FIGS. 16A and 16B are Smith Charts that illustrate example total impedance of two antenna designs. In particular, FIG. 16A illustrates a Smith Chart of the total impedance of 3D loop antenna 22 of FIGS. 2A and 2B, with dimensions of $L_{ANT}=70$ mm, $H_{ANT}=5$ mm, $F_{ANT}=13$ mm, and $W_{ANT}=6.25$ mm. FIG. 16B illustrates a Smith Chart of the total impedance of 3D loop antenna 301 that includes a slit 302 as described in FIGS. 15A and 15B, with dimensions of $L_{ANT}=75$ mm, $H_{ANT}=5$ mm, $F_{ANT}=32$ mm, $W_{ANT}=12.5$ mm, $S_{OFFSET}=5$ mm, and $L_{SLIT}=0.5$ mm. In FIGS. 16A and 16B, point 310 illustrates a desired region for optimal impedance matching for an example IC chip. Squares 312A and 312B illustrate an impedance of the antennas 22 and 301, respectively, at an example operating frequency of 915 MHz. As illustrated in FIG. 16A, 3D loop antenna 22 may, in some instances, not achieve the required reactance to match the example IC chip. As illustrated in FIG. 16B, however, adding slit 302 in the conductive trace forming antenna 301 results in the significantly improved impedance matching of the 3D loop antenna 301 and the example IC chip. As illustrated in FIG. 16B, the impedance vs. frequency curve shown in the Smith Chart is pulled way from the edge of the Smith Chart closer to the desired impedance 310.

Figure 17A:
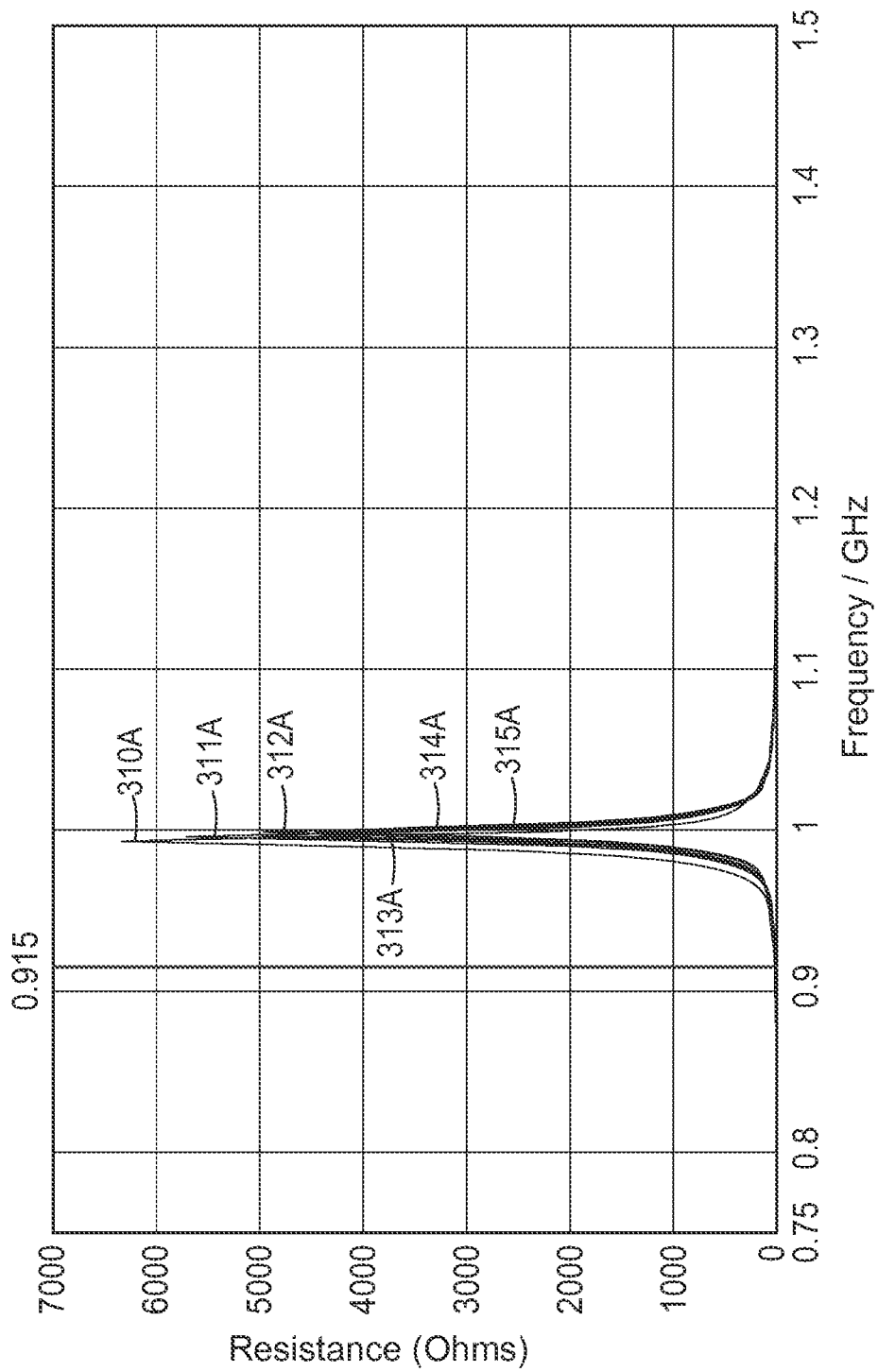
FIGS. 17A and 17B are graphs demonstrating example resistance and reactance curves that parameterize the length of slit ($L_{SLIT}$) of RFID tag of FIGS. 15A and 15B.
Figure 17B:
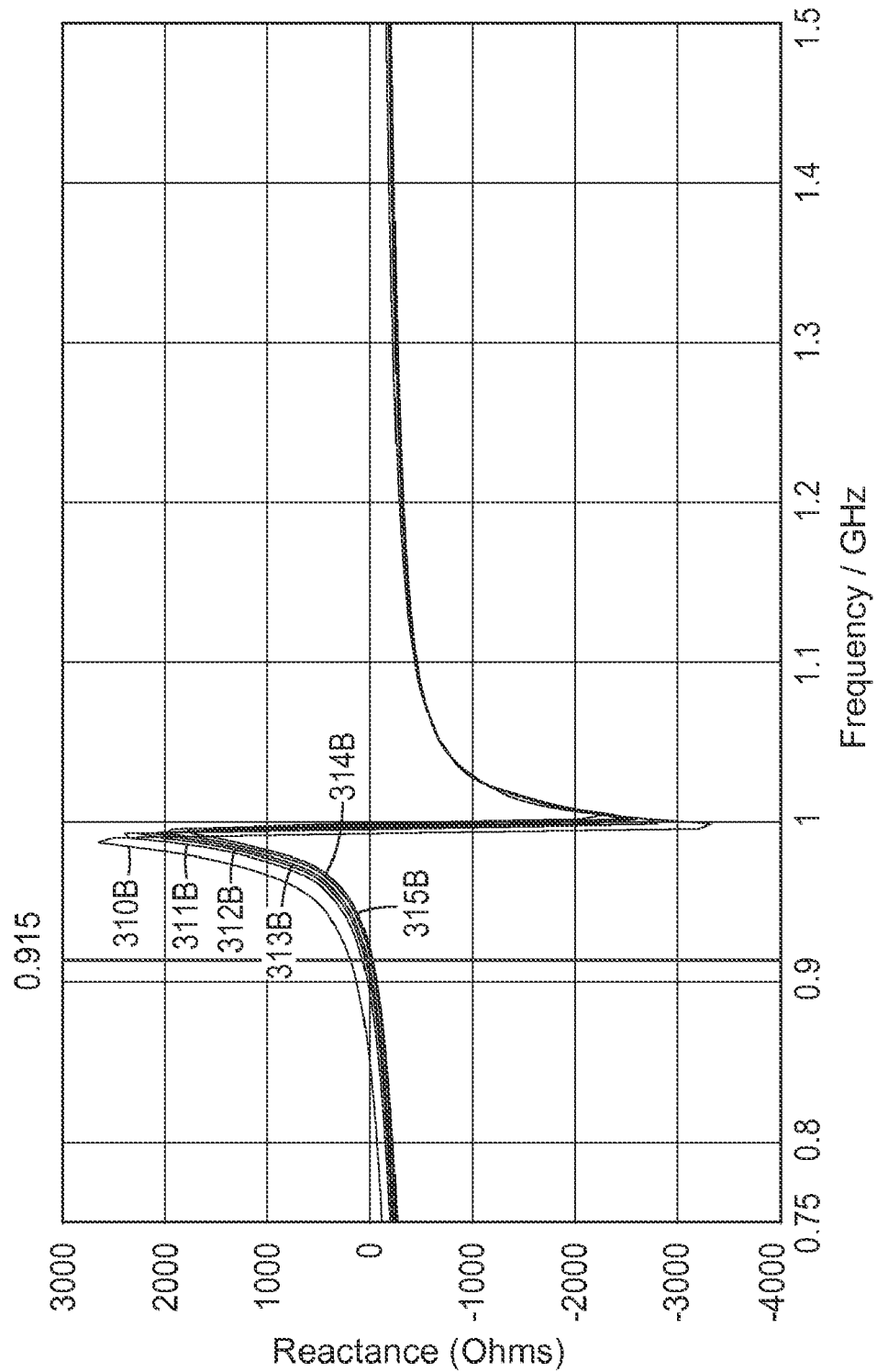

FIGS. 17A and 17B are graphs demonstrating example resistance and reactance curves that parameterize the length of slit 302 ($L_{SLIT}$) of RFID tag 300. Curves 320A-325A are resistance curves and curves 320B-325B are reactance curves for an RFID tag with $L_{SLIT}$ equal to about 0.2 mm, about 0.4 mm, about 0.5 mm, about 0.6 mm, about 0.8 mm, and about 1 mm, respectively. Computer modeling is performed with a vacuum spacer and the RFID tag 300 placed on an infinite ground plane. The computer modeling is performed with tag dimensions of $L_{ANT}=75$ mm, $H_{ANT}=5$ mm, $W_{ANT}=12.5$ mm, $F_{ANT}=30$ mm and $S_{OFFSET}=5$ mm. These dimensions of 3D loop antenna 301 remain constant as $L_{SLIT}$ is incrementally increased. The simulation is performed over the frequency range of 0 to 3 GHz.

The result of the computer modeling is shown in FIGS. 17A and 17B with a marker placed at an example operating frequency of 915 MHz. The result of the computer modeling suggests that increasing $L_{SLIT}$ results in minimal changes in the real part of the impedance (i.e., resistance). However, increasing $L_{SLIT}$ results in substantial changes in the imaginary part of the impedance (i.e., reactance). Moreover, the changes in the reactance are obtained without substantially affecting the resonance frequency of the 3D loop antenna 301. Table 6 below provides resulting resistance and reactance values of the computer modeling at the example operating frequency of 915 MHz are provided below.

TABLE 6

| $L_{SLIT}$ (mm) | Resistance (Ohms) | Reactance (Ohms) |
|---|---|---|
| 0.2 | 18.60 | 198.90 |
| 0.4 | 15.83 | 80.52 |
| 0.5 | 14.83 | 48.94 |
| 0.6 | 14.83 | 27.00 |
| 0.8 | 14.27 | −0.80 |
| 1.0 | 13.31 | −19.05 |

Figure 18A:
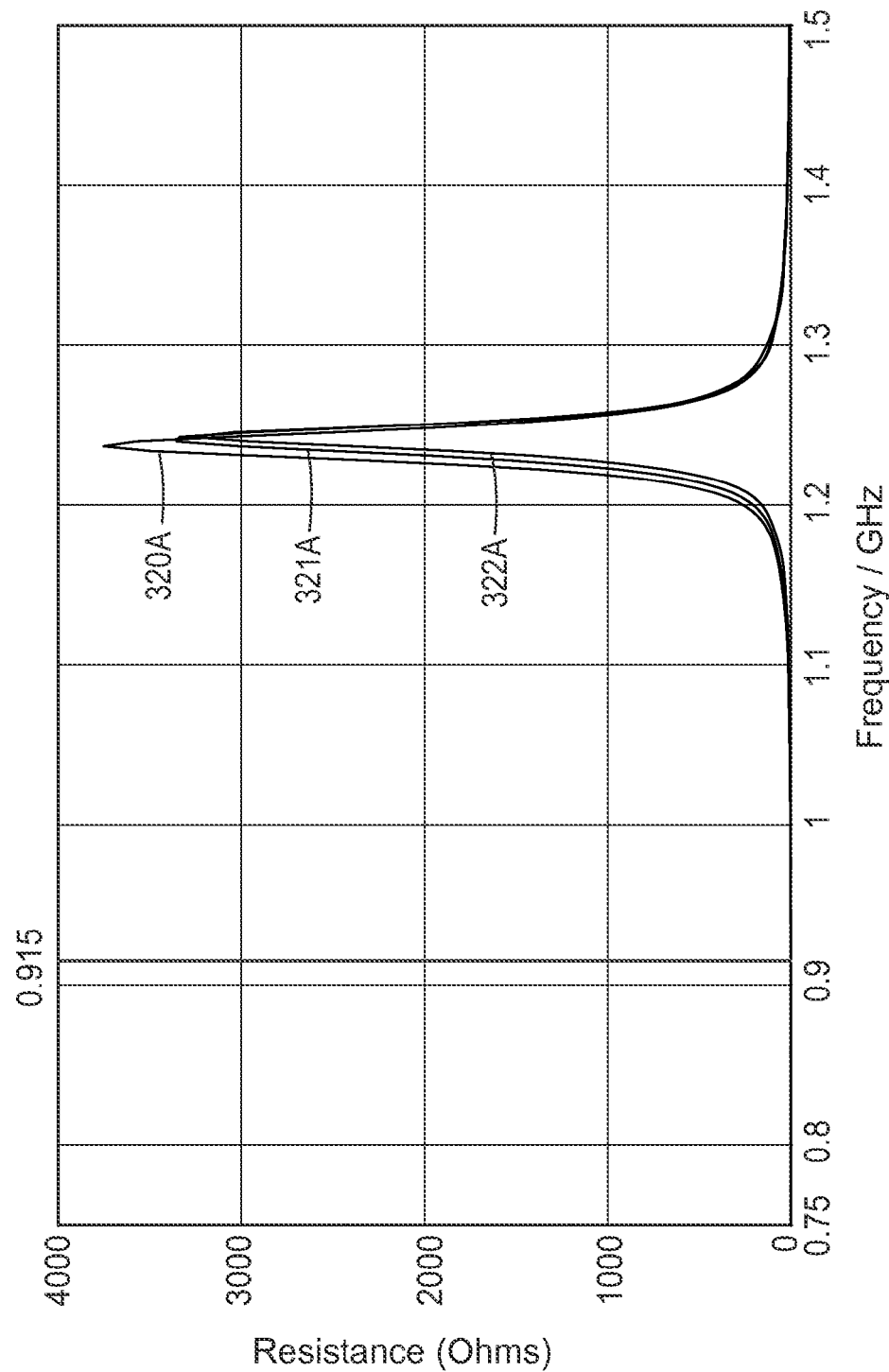
FIGS. 18A and 18B are graphs demonstrating example resistance and reactance curves that parameterize the slit offset ($S_{OFFSET}$) of RFID tag of FIGS. 15A and 15B.
Figure 18B:
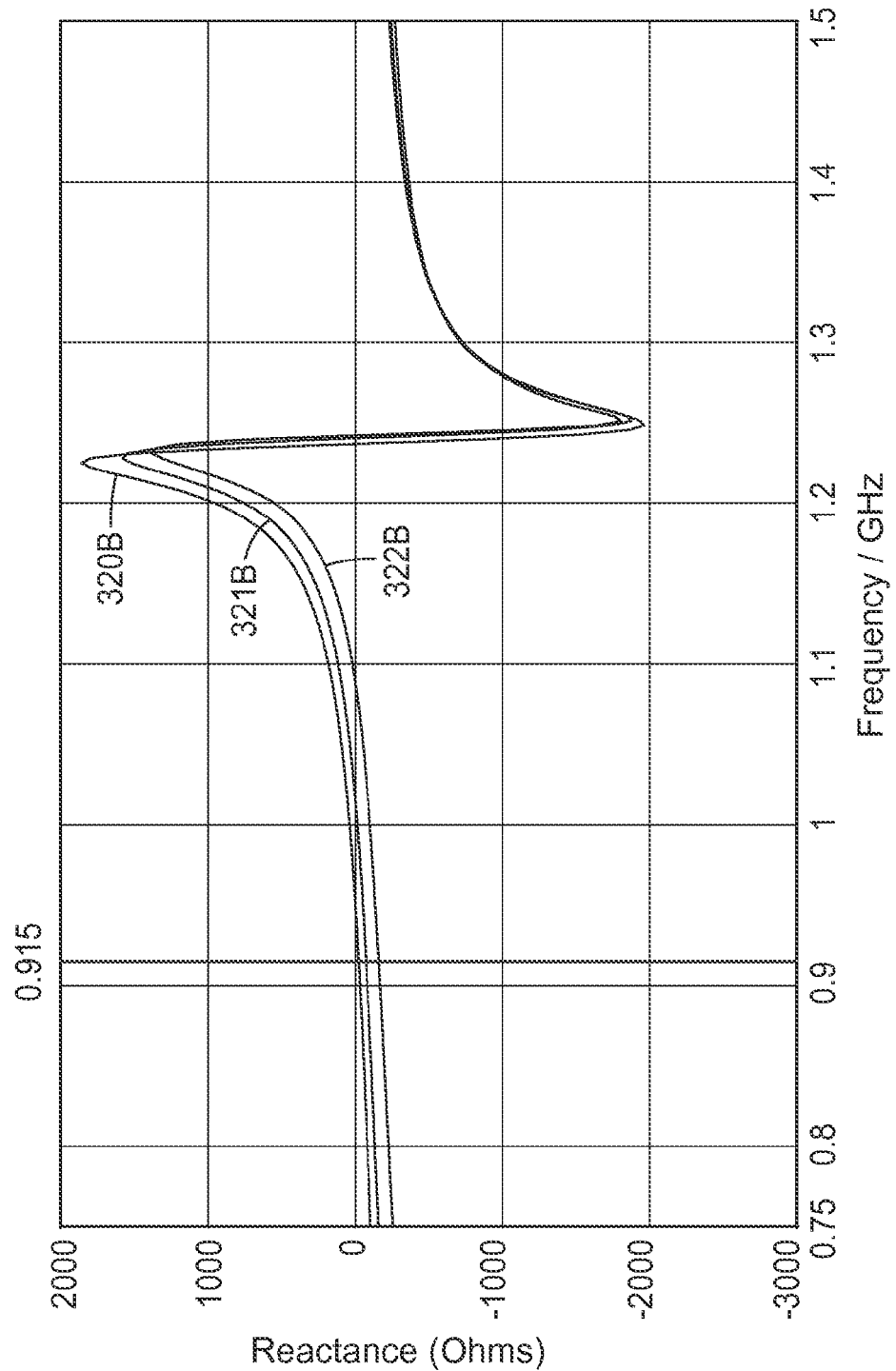

FIGS. 18A and 18B are graphs demonstrating example resistance and reactance curves that parameterize the slit offset $S_{OFFSET}$ of RFID tag 300. In other words, the graphs demonstrate example resistance and reactance curves that parameterize the results of changing the slit location with respect to the feed location. Curves 320A-323A are resistance curves and 320B-323B are reactance curves for an RFID tag with $S_{OFFSET}$ equal to about 5 mm, about 10 mm, and about 15 mm, respectively. Computer modeling is performed with a vacuum spacer and the RFID tag 300 placed on an infinite ground plane. The computer modeling is performed with tag dimensions of $L_{ANT}$=75 mm, $H_{ANT}$=5 mm, $W_{ANT}$=12.5 mm, $F_{ANT}$=15 mm and $L_{SLIT}$=0.5 mm. In this simulation the slit is placed on the shorter side of the feedpoint location $F_{ANT}$. These dimensions of 3D loop antenna 301 remain constant as $S_{OFFSET}$ is incrementally increased. The simulation is performed with frequencies from 0 to 3 GHz.

The result of the computer modeling is shown in FIGS. 18A and 18B with a marker placed at an example operating frequency of 915 MHz. The result of the computer modeling suggests that increasing $S_{OFFSET}$ results in minimal changes in the real part of the impedance (i.e., resistance). However, increasing $S_{OFFSET}$ results in substantial changes in the imaginary part of the impedance (i.e., reactance). Again, there is substantially no affect on the resonance frequency of 3D loop antenna 301. Table 7 below provides resulting resistance and reactance values of the computer modeling at the example operating frequency of 915 MHz are provided below.

TABLE 7

| $S_{OFFSET}$ (mm) | Resistance (Ohms) | Reactance (Ohms) |
|---|---|---|
| 5 | 2.521 | −158.80 |
| 10 | 1.696 | −72.30 |
| 15 | 1.899 | −21.91 |

Figure 19B:
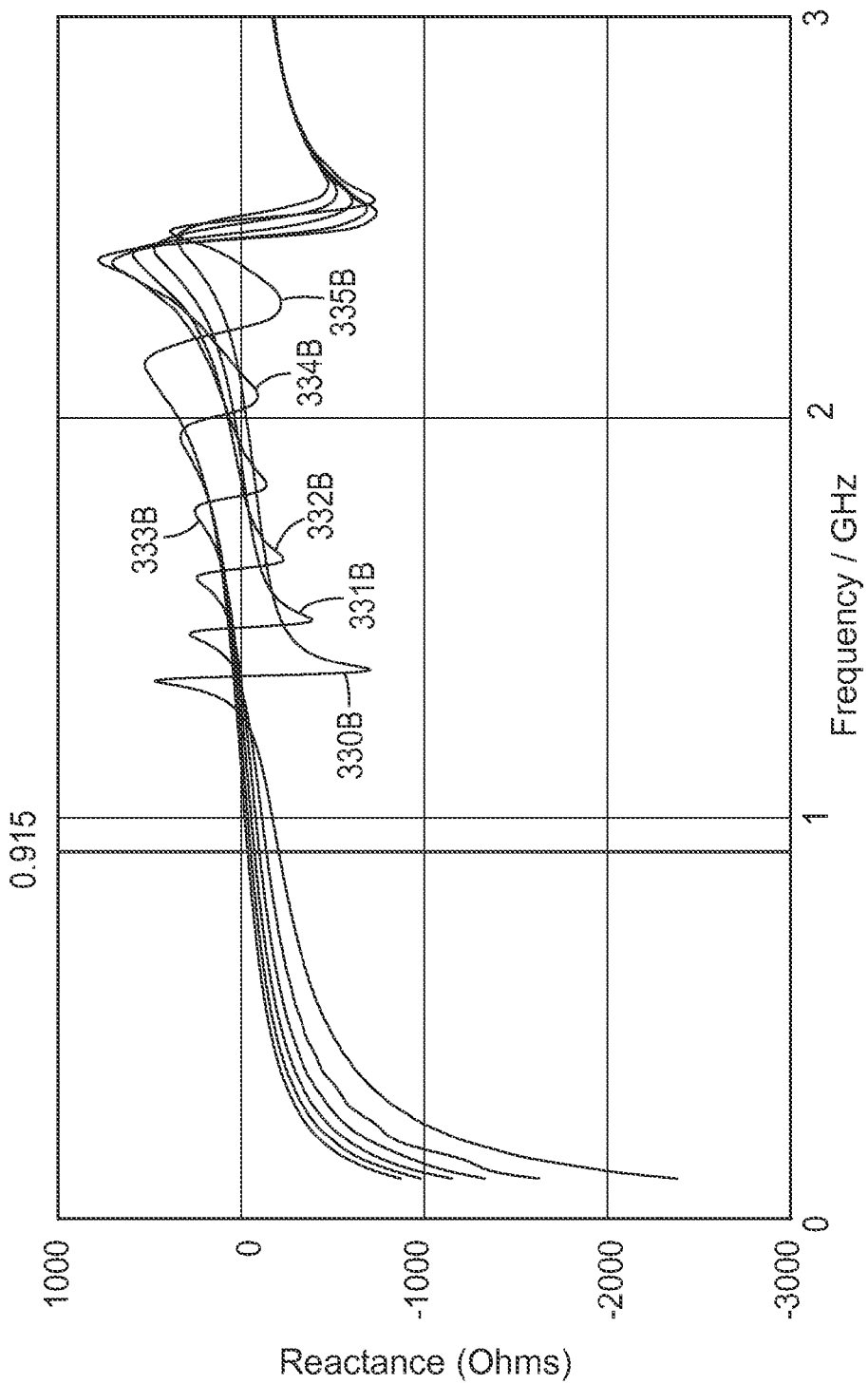

FIGS. 19A and 19B are graphs demonstrating example resistance and reactance curves that parameterize the slit offset $S_{OFFSET}$ of RFID tag 300. In this simulation the slit is placed on the longer side of the feedpoint location. In other words, if the offset of IC chip 26 from center 34 of antenna 22, i.e., $F_{ANT}$, is in the negative x-direction, slit offset $S_{OFFSET}$ would be in the positive x-direction from IC chip 26. Curves 330A-335A are resistance curves and 330B-335B are reactance curves for an RFID tag with $S_{OFFSET}$ equal to about 5 mm, about 10 mm, about 15 mm, about 20 mm, about 25 mm, and about 30 mm, respectively. Computer modeling is performed with a vacuum spacer and the RFID tag 300 placed on an infinite ground plane. The computer modeling is performed with tag dimensions of $L_{ANT}$=75 mm, $H_{ANT}$=5 mm, $W_{ANT}$=12.5 mm, $F_{ANT}$=15 mm and $L_{SLIT}$=0.5 mm. In this simulation the slit is placed on the shorter side of the feedpoint location. These dimensions of 3D loop antenna 301 remain constant as $S_{OFFSET}$ is incrementally increased. The simulation is performed with frequencies from 0 to 3 GHz.

The result of the computer modeling is shown in FIGS. 19A and 19B with a marker placed at an example operating frequency of 915 MHz. The result of the computer modeling suggests that placing $S_{OFFSET}$ on the longer side of 3D loop antenna 301 results in the resonance of 3D loop antenna 301 splitting into a double resonance. Additionally, as $S_{OFFSET}$ increases, the resonance frequency of 3D loop antenna 301 shifts higher into the UHF band. With respect to the resistance and reactance components of the impedance, increasing $S_{OFFSET}$ results in limited changes in the resistance and substantial changes in the reactance. Table 8 below provides resulting resistance and reactance values of the computer modeling at the example operating frequency of 915 MHz are provided below.

TABLE 8

| $S_{OFFSET}$ (mm) | Resistance (Ohms) | Reactance (Ohms) |
|---|---|---|
| 5 | 0.8061 | −206.1 |
| 10 | 1.477 | −139.2 |
| 15 | 0.7269 | −101.0 |
| 20 | 0.4825 | −74.38 |
| 25 | 0.5246 | −54.05 |
| 30 | 0.5365 | −37.69 |

Experiment 6

In Experiment 6, the read range of seven different RFID tags, i.e., RFID tag A, RFID tag B, RFID tag C, RFID tag D, RFID tag E, RFID tag F and RFID tag G, were determined. Each of the RFID tags were designed with a length $L_{ANT}$=75 mm, a width $W_{ANT}$=12.5 mm, a height $H_{ANT}$=1.5 mm, a feedpoint $F_{ANT}$=16 mm and a width_gnd=25 mm. RFID tags A-F were designed with a slit offset $S_{OFFSET}$=5 mm, but with varying slit lengths $L_{SLIT}$. RFID tag G was designed similar to tag D, except had a different slit offset $S_{OFFSET}$. The results of Experiment 6 provided in Table 9 below.

TABLE 9

| | $L_{SLIT}$ (mm) | $S_{OFFSET}$ (mm) | Read Range (ft) |
|---|---|---|---|
| RFID Tag A | 0 | 0 | <5 |
| RFID Tag B | 0.4 | 5 | 10 |
| RFID Tag C | 1 | 5 | 10 |
| RFID Tag D | 2 | 5 | 10 |
| RFID Tag E | 4 | 5 | 9 |
| RFID Tag F | 6 | 5 | 9 |
| RFID Tag G | 2 | 3 | 5 |

As illustrated by the results in Table 9, when the gap was shorted (gap=0), the tag did not read at the end of the test chamber. When the length of the slit $L_{SLIT}$ was increased and the slit offset $S_{OFFSET}$ remained the same, there was no substantial affect the read range results. When the length of the slit $L_{SLIT}$ remained the same and the slit offset $S_{OFFSET}$ was decreased, i.e., comparing the results of RFID Tag D and RFID Tag G, the reduction in the offset $S_{OFFSET}$ reduced the read range considerably. Based on these experimental results, it appears that $S_{OFFSET}$ may be better for tuning the RFID tag than $L_{SLIT}$.

Figure 20A:
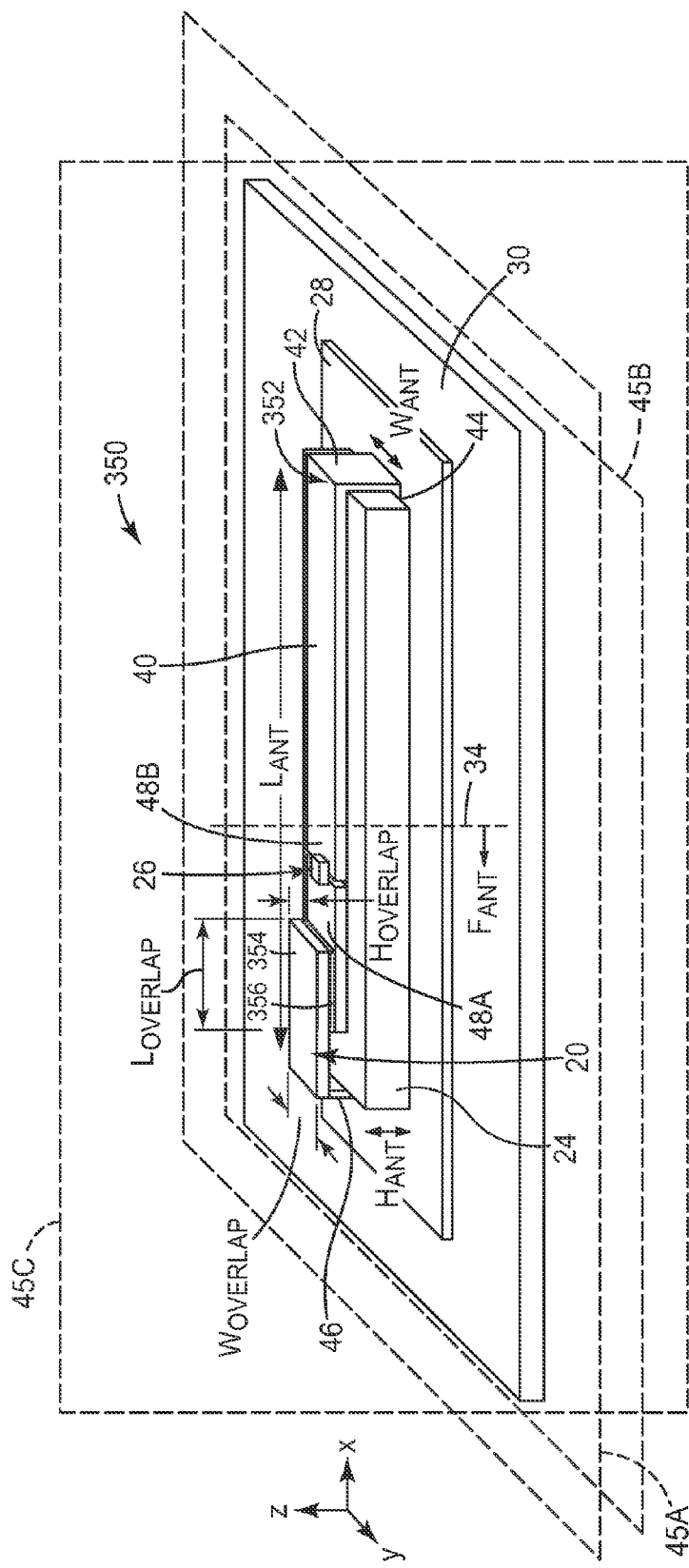
FIG. 20A is a schematic perspective view of another RFID tag in accordance with this disclosure.
Figure 20B:
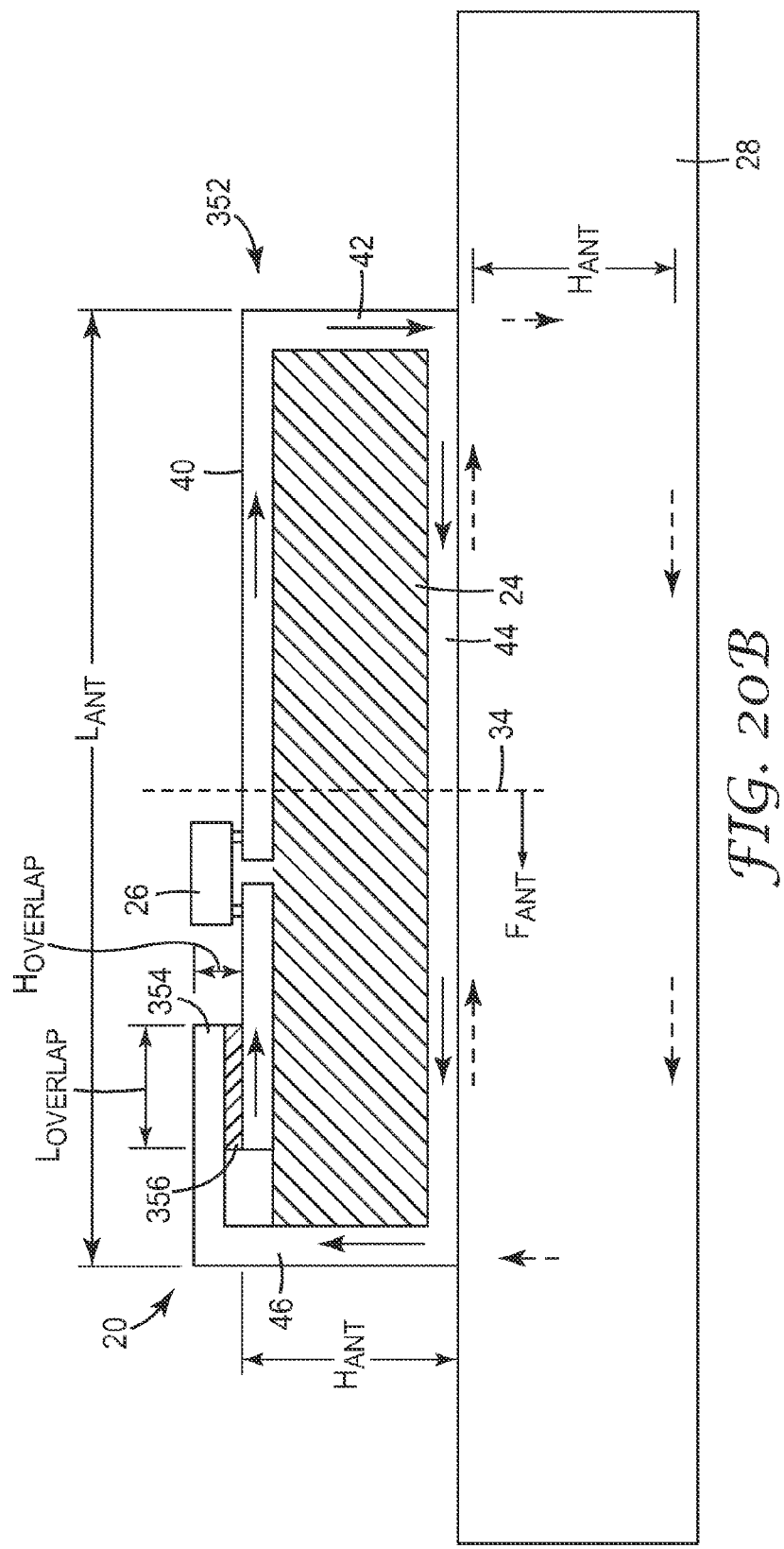
FIG. 20B is a cross-sectional view of the RFID tag of FIG. 20A.

FIGS. 20A and 20B illustrate another example RFID tag 350. FIG. 20A is a schematic perspective view of RFID tag 350 in conjunction with article surface 28. FIG. 20B is a cross-sectional view of RFID tag 350 in conjunction with article surface 28. RFID tag 350 conforms substantially with RFID tag 20 of FIG. 2A, but 3D loop antenna 352 of RFID tag 350 includes overlapping conductive portions that function as a tuning element. In particular, a conductive portion 354 of 3D loop antenna 352 overlaps at least part of conductive portion 40 of 3D loop antenna 352. As an example, conductive portion 354 and 40 may be partially overlapping conductive traces.

In some instances, 3D loop antenna 352 may include a substrate that separates conductive portion 354 from conductive portion 40. In other instances, conductive portions 354 and 40 may be separated by air. Like slit 302 of 3D loop antenna 301, the overlapping conductive portions of 3D loop antenna 352 may be located on the shorter side of conductive portion 40, e.g., to the left of center 34 and IC chip 26 in FIGS. 20A and 20B. The overlapping conductive portions 354, 40 may provide additional antenna parameters that may be adjusted to tune 3D loop antenna 352, including a height of the overlap $H_{OVERLAP}$, which is equal to the distance between conductive portion 354 and conductive portion 40, a length of the overlap $L_{OVERLAP}$, a width of the overlap $W_{OVERLAP}$, and an offset of the overlap $F_{OVERLAP}$, i.e., the distance from the feedpoint of IC chip 26 to the overlap. To increase capacitance, the overall area of the overlap ($W_{OVERLAP} \times L_{OVERLAP}$) can be increased or $H_{OVERLAP}$ can be decreased. The changes in capacitance will cause shifts in resonant frequency and can be used for tuning the antenna to a desired impedance.

FIG. 20B is a cross-sectional view of RFID tag 350 in conjunction with article surface 28. Similar reference numbers reference similar features. RF signal 18 excites a current through 3D loop antenna 352, thus generating a current loop through conductive portions 40, 42, 44, 46 and 354. The current loop through 3D loop antenna 352 is illustrated by the arrows. Unlike the current loop through 3D loop antenna 22 of FIG. 2B, the current loop through 3D loop antenna 352 traverses across the gap between conductive portion 354 and conductive portion 40. In particular, the overlapping portions of conductive portions 40, 354 each act as a capacitive plate that charge and discharge as the alternating current (AC) excited signal flows through 3D loop antenna 352. Thus, current flows between overlapping conductive portions 354, 40 making it appear that the alternating current is flowing through 3D loop antenna 352 unimpeded, while still providing the capacitive tuning capabilities described above.

Although FIGS. 20A and 20B illustrate the use of overlapping capacitive tuning element within an antenna similar to that shown in FIGS. 2A and 2B, overlapping conductive portions 354, 40 may be added to other antenna structures, such as 3D loop antenna 50 illustrated in FIGS. 3A and 3B, to provide similar tuning capabilities. Furthermore, RFID tag 350 may include overlapping conductive portions for use in tuning 3D loop antenna 352 without the feedpoint $F_{ANT}$ of being offset from center 34 of antenna 352. In this case, IC chip 26 is located at center XX of 3D loop antenna 352, i.e., $F_{ANT}=0$.

Various embodiments have been described. These and other embodiments are within the scope of the following claims.

The invention claimed is:

1. A radio frequency identification (RFID) tag comprising:
   a loop antenna that includes:
      a first conductive portion having a length and width that substantially exceed a thickness of the first conductive portion, wherein the length and width of the first conductive portion substantially lie in a first plane, at least a portion of the first conductive portion forming a tuning element for tuning an impedance of the loop antenna; and
      a second conductive portion having a length and width that substantially exceed a thickness of the second conductive portion, wherein the length and width of the second conductive portion substantially lie in a second plane that is substantially parallel to the first plane, the second conductive portion being electrically coupled to the first conductive portion; and
   an RFID circuit electrically connected to the loop antenna, wherein a current is excited through the loop antenna to flow through the first conductive portion and the second conductive portion in a current loop that lies in a third plane that is substantially perpendicular to the first plane and the second plane.

2. The RFID tag of claim 1, wherein the RFID tag is configured such that the third plane is substantially perpendicular to a surface of an article when attached to the surface of the article.

3. The RFID tag of claim 1, wherein the second conductive portion couples to a conductive surface of an article to form the current loop that lies in the third plane.

4. The RFID tag of claim 3, wherein the second conductive portion includes a pair of contact points that couple to the conductive surface to form the current loop.

5. The RFID tag of claim 3, wherein the second conductive portion electrically couples to the conductive surface of the article to form the current loop.

6. The RFID tag of claim 3, wherein the second conductive portion electromagnetically couples to the conductive surface of the article to form the current loop.

7. The RFID tag of claim 1, wherein the RFID tag is configured such that the current flowing through the loop antenna induces a current on a conductive surface of an article to which the RFID tag is attached to enhance a magnetic field generated by the loop antenna.

8. The RFID tag of claim 7, wherein the current induced on the conductive surface of the article substantially doubles an area enclosed by the current loop of the loop antenna.

9. The RFID tag of claim 1, the loop antenna defining a length, wherein the RFID circuit is centered along the length.

10. The RFID tag of claim 1, the loop antenna defining a length, wherein the RFID circuit is offset from a center of the length of the loop antenna.

11. The RFID tag of claim 1, wherein the first conductive portion includes at least one slit that forms a gap in the first conductive portion that functions as the tuning element for tuning the impedance of the antenna to substantially match an impedance of the RFID circuit to which the antenna is coupled.

12. The RFID tag of claim 11, wherein the RFID circuit is coupled to the first conductive portion of the loop antenna at a location offset from a center of the loop antenna and the slit that forms the gap in the first conductive portion of the loop antenna is offset from the RFID circuit in the same direction as the RFID circuit is offset from the center of the loop antenna.

13. The RFID tag of claim 12, further comprising a non-conductive material separating the overlapping conductive traces.

14. The RFID tag of claim 12, wherein the RFID circuit is coupled to the first conductive portion of the loop antenna at a location offset from a center of the loop antenna and the overlapping conductive traces are offset from the RFID circuit in the same direction as the RFID circuit is offset from the center of the loop antenna.

15. The RFID tag of claim 1, wherein the first conductive portion includes a first conductive trace that substantially overlaps at least a portion of a second conductive trace to form the tuning element for tuning the impedance of the antenna to substantially match an impedance of the RFID circuit to which the antenna is coupled.

16. The RFID tag of claim 1, wherein the loop antenna is tuned to operate in an ultra high frequency (UHF) range of the radio spectrum.

17. The RFID tag of claim 1, wherein the length of the first conductive portion and the length of the second conductive portion are at least approximately 50 millimeters (mm), the width of the first conductive portion and the width of the second conductive portion are between approximately 12-50 mm, and the thickness of the first and second conductive portion is less than approximately 1 mm.

18. The RFID tag of claim 1, wherein the loop antenna defines an inner space, the RFID tag further comprising a spacer material disposed within the inner space.

19. The RFID tag of claim 1, wherein the RFID circuit comprises one of an integrated circuit (IC), a surface acoustic wave (SAW), and an organic circuit.

20. A radio frequency identification (RFID) system comprising:
  a reader unit configured to output an interrogating radio frequency (RF) field; and
  an RFID tag comprising:
    a loop antenna that includes:
      a first conductive portion having a length and width that substantially exceed a thickness of the first conductive portion, wherein the length and width of the first conductive portion substantially lie in a first plane, at least a portion of the first conductive portion forming a tuning element for tuning an impedance of the loop antenna; and
      a second conductive portion having a length and width that substantially exceed a thickness of the second conductive portion, wherein the length and width of the second conductive portion substantially lie in a second plane that is substantially parallel to the first plane, the second conductive portion being electrically coupled to the first conductive portion; and
    an RFID circuit electrically connected to the loop antenna, wherein a current is excited through the first conductive portion and the second conductive portion in a current loop that lies in a third plane that is substantially perpendicular to the first plane and the second plane to output an RF signal in response to the interrogating RF signal.

21. The system of claim 20, wherein the RFID tag is configured such that the third plane is substantially perpendicular to a surface of an article when attached to the surface of the article.

22. The system of claim 20, wherein the second conductive portion couples to a conductive surface of an article to form the current loop that lies in the third plane.

23. The system of claim 22, wherein the second conductive portion includes a pair of contact points that couple to the conductive surface.

24. The system of claim 22, wherein the second conductive portion couples to the conductive surface of the article to form the current loop via one of an electrical coupling and an electromagnetic coupling.

25. The system of claim 20, wherein the RFID tag is configured such that the current flowing through the loop antenna induces a current on a conductive surface of an article to which the RFID tag is attached to enhance a magnetic field generated by the loop antenna.

26. The system of claim 25, wherein the current induced on the conductive surface of the article substantially doubles the magnetic field of the loop antenna.

27. The system of claim 20, the loop antenna defining a length, wherein the IC chip is centered along the length.

28. The system of claim 20, the loop antenna defining a length, wherein the IC chip is offset from a center of the length of the loop antenna.

29. The system of claim 20, wherein the first conductive portion includes at least one slit that forms a gap in the first conductive portion that functions as the tuning element for tuning the impedance of the antenna to substantially match an impedance of the RFID circuit to which the antenna is coupled.

30. The system of claim 29, wherein the RFID circuit is coupled to the first conductive portion of the loop antenna at a location offset from a center of the loop antenna and the slit that forms the gap in the first conductive portion of the loop antenna is offset from the RFID circuit in the same direction as the RFID circuit is offset from the center of the loop antenna.

31. The system of claim 20, wherein the first conductive portion includes a first conductive trace that substantially overlaps at least a portion of a second conductive trace to form the tuning element for tuning the impedance of the antenna to substantially match an impedance of the RFID circuit to which the antenna is coupled.

32. The system of claim 31, further comprising a non-conductive material separating the overlapping conductive traces.

33. The system of claim 31, wherein the RFID circuit is coupled to the first conductive portion of the loop antenna at a location offset from a center of the loop antenna and the overlapping conductive traces are offset from the RFID circuit in the same direction as the RFID circuit is offset from the center of the loop antenna.

34. The system of claim 20, wherein the loop antenna operates in an ultra high frequency (UHF) range of the radio spectrum.

35. The system of claim 20, wherein the length of the first conductive portion and the length of the second conductive portion are at least approximately 50 millimeters (mm), the width of the first conductive portion and the width of the second conductive portion are between approximately 12-50 mm, and the thickness of the first and second conductive portion is less than approximately 1 mm.

36. An article comprising:
  an electrically conductive surface; and
  an radio frequency identification (RFID) tag coupled to the electrically conductive surface of the article, the RFID tag comprising:
    a loop antenna comprising:
      a first conductive portion having a length and width that substantially exceed a thickness of the first conductive portion, wherein the length and width of the first conductive portion substantially lie in a first plane, at least a portion of the first conductive portion forming a tuning element for tuning an impedance of the loop antenna; and
      a second conductive portion having a length and width that substantially exceed a thickness of the second conductive portion, wherein the length and width of the second conductive portion substantially lie in a second plane that is substantially parallel to the first plane, the second conductive portion being electrically coupled to the first conductive portion; and an RFID circuit electrically connected to the loop antenna, wherein a current is excited through the loop antenna to flow through the first conductive portion and the second conductive portion in a current loop that lies in a third plane that is not substantially parallel to the electrically conductive surface of the article.

37. The article of claim 36, wherein the RFID tag is configured such that the third plane is substantially perpendicular to the electrically conductive surface of the article.

38. The article of claim 36, wherein the second conductive portion couples to the electrically conductive surface of the article to form the current loop that lies in the third plane.

39. The article of claim 38, wherein the second conductive portion includes a pair of contact points that couple to the electrically conductive surface of the article.

40. The article of claim 38, wherein the second conductive portion couples to the electrically conductive surface of the article to form the current loop via one of an electrical coupling and an electromagnetic coupling.

41. The article of claim 36, wherein the RFID tag is configured such that the current flowing through the loop antenna induces a current on the electrically conductive surface of the article to enhance a magnetic field generated by the loop antenna.

42. The article of claim 41, wherein the current induced on the electrically conductive surface of the article substantially doubles the magnetic field of the loop antenna.

43. The article of claim 36, wherein the first conductive portion includes at least one slit that forms a gap in the first conductive portion that functions as the tuning element for tuning the impedance of the antenna to substantially match an impedance of the RFID circuit to which the antenna is coupled.

44. The article of claim 43, wherein the RFID circuit is coupled to the first conductive portion of the loop antenna at a location offset from a center of the loop antenna and the slit that forms the gap in the first conductive portion of the loop antenna is offset from the RFID circuit in the same direction as the RFID circuit is offset from the center of the loop antenna.

45. The article of claim 36, wherein the first conductive portion includes a first conductive trace that substantially overlaps at least a portion of a second conductive trace to form the tuning element for tuning the impedance of the antenna to substantially match an impedance of the RFID circuit to which the antenna is coupled.

46. The article of claim 45, further comprising a nonconductive material separating the overlapping conductive traces.

47. The article of claim 45, wherein the RFID circuit is coupled to the first conductive portion of the loop antenna at a location offset from a center of the loop antenna and the overlapping conductive traces are offset from the RFID circuit in the same direction as the RFID circuit is offset from the center of the loop antenna.

* * * * *

UNITED STATES PATENT AND TRADEMARK OFFICE
CERTIFICATE OF CORRECTION

| | |
|---|---|
| PATENT NO. | : 7,847,697 B2 |
| APPLICATION NO. | : 12/143573 |
| DATED | : December 7, 2010 |
| INVENTOR(S) | : Riki Banerjee |

It is certified that error appears in the above-identified patent and that said Letters Patent is hereby corrected as shown below:

<u>Column 17</u>
Line 54, delete "5B" and insert -- 51B --, therefor.

<u>Column 32</u>
Line 38 (approx.), delete "6 provided" and insert -- 6 are provided --, therefor.

Signed and Sealed this
Fifteenth Day of February, 2011

David J. Kappos
*Director of the United States Patent and Trademark Office*